US012640301B2

(12) United States Patent
Chen et al.

(10) Patent No.: US 12,640,301 B2
(45) Date of Patent: May 26, 2026

(54) MAGNETIC ELEMENT, METHOD FOR MANUFACTURING THE SAME AND SUBSTRATE

(71) Applicant: Delta Electronics (Shanghai) Co.,Ltd., Shanghai (CN)

(72) Inventors: Qingdong Chen, Shanghai (CN); Wen Han, Shanghai (CN); Shouyu Hong, Shanghai (CN); Ganyu Zhou, Shanghai (CN); Zhiheng Fu, Shanghai (CN); Jinping Zhou, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 971 days.

(21) Appl. No.: 17/804,601

(22) Filed: May 31, 2022

(65) Prior Publication Data

US 2022/0392691 A1 Dec. 8, 2022

(30) Foreign Application Priority Data

Jun. 8, 2021 (CN) ......................... 202110637204.6

(51) Int. Cl.
*H01F 27/28* (2006.01)
*H01F 27/24* (2006.01)
(Continued)

(52) U.S. Cl.
CPC ......... *H01F 27/2804* (2013.01); *H01F 27/24* (2013.01); *H01F 27/32* (2013.01); *H01F 41/041* (2013.01); *H01F 41/12* (2013.01)

(58) Field of Classification Search
CPC ...... H01F 27/2804; H01F 27/24; H01F 27/32; H01F 41/041; H01F 2027/2809;
(Continued)

(56) References Cited

U.S. PATENT DOCUMENTS 9,263,177 B1 2/2016 Ikriannikov et al.
2006/0176139 A1* 8/2006 Pleskach ............ H01F 17/0033 336/223
(Continued)

FOREIGN PATENT DOCUMENTS

CN 103430256 A 12/2013
CN 103943306 A 7/2014
(Continued)

*Primary Examiner* — Shawki S Ismail
*Assistant Examiner* — Kazi S Hossain
(74) *Attorney, Agent, or Firm* — CKC & Partners Co., LLC

(57) ABSTRACT

The present invention provides a magnetic element, a method for manufacturing the same and a substrate. The magnetic element includes: a first wiring region including a first conductive layer and a second conductive layer which are arranged along a first direction; a second wiring region including a third conductive layer and a fourth conductive layer which are arranged along a second direction perpendicular to the first direction and are disposed in opposite sides of the second wiring region, respectively; an accommodating space disposed between the third conductive layer and the fourth conductive layer, wherein the second conductive layer is disposed on one side of the first conductive layer away from the accommodating space; and a magnetic column disposed within the accommodating space, wherein the third conductive layer includes a first wiring region directly connected to the first conductive layer, to form a part of windings of the magnetic element.

21 Claims, 25 Drawing Sheets

(51) Int. Cl.
*H01F 27/32* (2006.01)
*H01F 41/04* (2006.01)
*H01F 41/12* (2006.01)

(58) Field of Classification Search
CPC .......... H01F 27/34; H01F 27/28; H01F 41/00; H01F 41/12; H01F 17/0013; H01F 17/0033; H01F 41/046
USPC .......................................... 336/200, 232, 192
See application file for complete search history.

(56) References Cited

U.S. PATENT DOCUMENTS

| | | | | |
|---|---|---|---|---|
| 2013/0056847 | A1 | 3/2013 | Chen | |
| 2015/0235753 | A1* | 8/2015 | Chatani | H01F 27/2804 336/200 |
| 2017/0084384 | A1* | 3/2017 | Otsubo | H01F 17/06 |
| 2017/0178794 | A1 | 6/2017 | Yan et al. | |
| 2017/0222563 | A1 | 8/2017 | Noma et al. | |
| 2017/0345756 | A1 | 11/2017 | Yin et al. | |
| 2019/0333674 | A1* | 10/2019 | Quilici | H05K 3/4611 |
| 2020/0143985 | A1 | 5/2020 | Cai et al. | |
| 2020/0161042 | A1 | 5/2020 | Cai et al. | |
| 2020/0169181 | A1 | 5/2020 | Zhou et al. | |
| 2020/0260586 | A1 | 8/2020 | Hong et al. | |
| 2021/0005378 | A1 | 1/2021 | Hong et al. | |

FOREIGN PATENT DOCUMENTS

| | | | | | |
|---|---|---|---|---|---|
| CN | 105084291 | B | | 9/2017 | |
| CN | 207098945 | U | | 3/2018 | |
| CN | 104425104 | B | | 7/2018 | |
| CN | 111145987 | A | | 5/2020 | |
| CN | 111145988 | A | | 5/2020 | |
| CN | 111952293 | A | | 11/2020 | |
| CN | 112530680 | A | * | 3/2021 | H01F 41/04 |
| GB | 2299714 | B | | 11/1999 | |
| JP | H0737712 | A | | 2/1995 | |
| JP | 2016082072 | A | | 5/2016 | |
| JP | 2017139407 | A | | 8/2017 | |
| PL | 219054 | B1 | | 3/2015 | |

* cited by examiner

A1-A1'

MAGNETIC ELEMENT, METHOD FOR MANUFACTURING THE SAME AND SUBSTRATE

CROSS-REFERENCE TO RELATED APPLICATIONS

This non-provisional application claims priority under 35 U.S.C. § 119(a) on Patent Applications No. 202110637204.6 filed on Jun. 8, 2021, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

BACKGROUND OF THE INVENTION

1. Field of the Invention

The present invention relates to a magnetic element, a method for manufacturing the same and a substrate.

2. Related Art

With improvement of human requirements for intelligent life, the requirement of society for data processing is increasing. Global energy consumption of data processing reaches hundreds of billions, even trillions of kilowatt hours per year on average, and an occupied area of a large data center may reach tens of thousands of square meters. Therefore, high efficiency and high power density are key indexes for healthy development of the industry.

A key unit of the data center is a server, and its main board is often formed by data processing chips such as Central Processing Unit (CPU), Chipsets and memories, power supplies and essential peripheral components. Improvement of processing capability of the server per unit volume means that the number and an integration level of these chips are also improved, causing a significant increase in space occupation and power consumption. Therefore, the power supply, which is also referred to as a main board power supply because it is on the same main board with the data processing chips, for powering these chips is desired to possess a higher efficiency, a higher power density and a smaller volume to support the requirements for energy conservation and reduction of the occupied area of the whole server or even the whole data center. To satisfy the requirement for a high power density, a switching frequency of the power supply also becomes higher, and a switching frequency of the power supply with a low voltage and high current in the industry is basically 1 Megahertz (MHz) or above.

With respect to a transformer applied to a low voltage and high current, a higher power density and a higher conversion efficiency are current problems still to be solved.

FIG. 1A is a sectional diagram of a magnetic element in the related art taken in a thickness direction, and FIG. 1B is a top view taken along a direction of a sectional line A1-A1' in FIG. 1A. The magnetic element 100' includes a magnetic core 200', a first winding 101', a second winding 102' and a third winding 103', and further includes a first insulating layer 104', a second insulating layer 105' and a third insulating layer 106', the first insulating layer 104' is disposed between the magnetic core 200' and the first winding 101', the second insulating layer 105' is disposed between the first winding 101' and the second winding 102', and a third insulating layer 106' is disposed between the second winding 102' and the third winding 103'. The windings 101' to 103' and the insulating layers 104' to 106' of the magnetic core 200' are formed to be an integral body through a substrate 300'.

As can be seen from FIGS. 1A and 1B, vertical connection portions 101-1' and 102-1' of the first winding 101' and the second winding 102' on left and right sides of the magnetic core 200' are implemented through connection holes 101-2' and 102-2' (e.g., conductive through holes), and a vertical connection portion 103-1' of the third winding 103' is implemented through a sidewall copper. Here, a width size of the connection hole 101-2' corresponding to the first winding 101' is D1, and a width size of the connection hole 102-2' corresponding to the second winding 102' is D2. As for such a hole structure, the function of conducting current is actually implemented through a hole copper portion. The hole copper has a hollow structure, such that its internal size has not been reasonably utilized. Continuing to refer to FIG. 1B, it is necessary to keep a certain distance between the connection holes 101-2' and 102-2' to satisfy requirements for mechanical drilling. As a result, the structure of the connection holes further limits the capability of conducting current.

Continuing to refer to FIG. 1A, the substrate 300' may be implemented by a PCB process, where a width of the first insulating layer 104' is G1, a width of the second insulating layer 105' is G2, and a width of the third insulating layer 106' is G3. In the process of manufacturing the substrate 300', the three windings 101' to 103' are to be processed sequentially, which requires to keep a certain distance between adjacent two windings to satisfy the requirements for the manufacture process and reliability when the connection holes in the vertical portions of each winding is manufactured. Generally, the distance is required to be 0.4 mm or above in the art. In a case where a width size of the magnetic core is fixed, the process increases a size of the magnetic element. With an increasing demand for the power density of the module in the system, such a structural form is certainly leading to a waste of spatial size. Therefore, it is demanded to further optimize the structure of the windings so as to achieve a smaller occupied area, thereby improving a power density of the module, and satisfying urgent needs in the market.

SUMMARY OF THE INVENTION

An object of the present invention is to provide a magnetic element, a method for manufacturing the same and a substrate, which may solve one or more deficiencies in the prior art.

To achieve the above objects, according to one embodiment of the present invention, the present invention provides a magnetic element, including: a first wiring region including a first conductive layer and a second conductive layer which are arranged along a first direction; a second wiring region including a third conductive layer and a fourth conductive layer which are arranged along a second direction perpendicular to the first direction and are disposed in opposite sides of the second wiring region, respectively; an accommodating space disposed between the third conductive layer and the fourth conductive layer, wherein the first conductive layer and the third conductive layer are disposed close to the accommodating space, and the second conductive layer is disposed on one side of the first conductive layer away from the accommodating space; and a magnetic column disposed within the accommodating space, wherein the third conductive layer includes a first trace portion having one end in direct contact with and connected to the first conductive layer, to form a part of windings of the magnetic element.

In one embodiment of the present invention, the third conductive layer further includes a second trace portion which is arranged close to one end of the first trace portion of the third conductive layer and separated from the first trace portion of the third conductive layer, and wherein the second trace portion of the third conductive layer is in direct contact with and connected to the second conductive layer, to form a part of the windings of the magnetic element.

In one embodiment of the present invention, the fourth conductive layer includes a first trace portion having one end in direct contact with and connected to the first conductive layer, to form a part of the windings of the magnetic element.

In one embodiment of the present invention, the fourth conductive layer further includes a second trace portion which is arranged close to one end of the first trace portion of the fourth conductive layer and separated from the first trace portion of the fourth conductive layer, and wherein the second trace portion of the fourth conductive layer is in direct contact with and connected to the second conductive layer, to form a part of the windings of the magnetic element.

In one embodiment of the present invention, the second wiring region further includes at least one fifth conductive layer which is disposed on one side of the fourth conductive layer away from the third conductive layer, wherein one of the at least one fifth conductive layer is connected to the fourth conductive layer through a blind via, to form a part of the windings of the magnetic element.

In one embodiment of the present invention, the fourth conductive layer includes a first trace portion having one end connected to the first conductive layer through a blind via, to form a part of the windings of the magnetic element.

In one embodiment of the present invention, the fourth conductive layer further includes a second trace portion which is arranged close to one end of the first trace portion of the fourth conductive layer and separated from the first trace portion of the fourth conductive layer, and wherein the second trace portion of the fourth conductive layer is connected to the second conductive layer through a blind via, to form a part of the windings of the magnetic element.

In one embodiment of the present invention, the second wiring region further includes at least one sixth conductive layer which is disposed on one side of the third conductive layer away from the fourth conductive layer, wherein one of the at least one sixth conductive layer is connected to the second conductive layer through a blind via, to form a part of the windings of the magnetic element.

In one embodiment of the present invention, the at least one fifth conductive layer includes one inner fifth conductive layer and at least one outer fifth conductive layer, wherein the at least one outer fifth conductive layer is disposed on one side of the inner fifth conductive layer away from the fourth conductive layer, and the inner fifth conductive layer is connected to the fourth conductive layer through a blind via, to form a part of the windings of the magnetic element.

In one embodiment of the present invention, one of the at least one outer fifth conductive layer is connected to the second conductive layer through a blind via, to form a part of the windings of the magnetic element.

In one embodiment of the present invention, the second wiring region further includes at least one fifth conductive layer which is disposed on one side of the fourth conductive layer away from the third conductive layer, wherein one of the at least one fifth conductive layer is connected to the second conductive layer through a blind via, to form a part of the windings of the magnetic element.

In one embodiment of the present invention, the magnetic element includes two first wiring regions disposed in the opposite sides of the accommodating space, and wherein each end of the first trace portion of the third conductive layer is in direct contact with and connected to one first conductive layer, to form a part of the windings of the magnetic element.

In one embodiment of the present invention, the third conductive layer further includes two second trace portions which are arranged close to two ends of the first trace portion of the third conductive layer, respectively, and each separated from the first trace portion of the third conductive layer, and wherein each of the second trace portions of the third conductive layer is in direct contact with and connected to one second conductive layer, to form a part of the windings of the magnetic element.

In one embodiment of the present invention, each inner wall of the accommodating space close to the first conductive layer and the third conductive layer is laid with an inner wall conductive layer, to form a part of the windings of the magnetic element.

In one embodiment of the present invention, the second wiring region further includes a seventh conductive layer and an eighth conductive layer, each of which is disposed between the fourth conductive layer and the magnetic column, wherein the eighth conductive layer is disposed on one side of the seventh conductive layer away from the magnetic column, and wherein the seventh conductive layer is connected to the eighth conductive layer through a blind via, and in direct contact with and connected to the inner wall conductive layer, to form a part of the windings of the magnetic element.

In one embodiment of the present invention, the magnetic element includes two first wiring regions, one second wiring region, two accommodating spaces disposed separately, two magnetic columns and one third wiring region, wherein each of the two accommodating spaces is disposed between the two first wiring regions, with the third wiring region interposed between the two accommodating spaces, wherein each of the magnetic columns is disposed within one of the accommodating spaces, respectively, wherein the third wiring region includes two ninth conductive layers which are arranged along the first direction and are disposed in opposite sides of the third wiring region, respectively, wherein the third conductive layer includes two first trace portions, each of which is disposed close to one of the accommodating spaces, respectively, and wherein the first conductive layer and the ninth conductive layer, which are arranged on opposite sides of each magnetic column, are in direct contact with and connected to a first end and a second end of the first trace portion of the third conductive layer that is arranged close to the magnetic column, to form a part of the windings of the magnetic element.

In one embodiment of the present invention, the third wiring region further includes a through hole which is disposed between the two ninth conductive layers, wherein the windings of the magnetic element includes a plurality of layers of sub-windings which are wound sequentially around each of the magnetic columns from inside to outside, with two outermost-layer sub-windings disposed on the outermost layers away from the two magnetic columns, respectively, and wherein a sidewall of the through hole is configured to form a common winding portion of the two outermost-layer sub-windings.

In one embodiment of the present invention, the third wiring region further includes two tenth conductive layers disposed separately and one eleventh conductive layer which are all arranged along the first direction, wherein the two tenth conductive layers are both disposed between the two ninth conductive layers, and the eleventh conductive layer is disposed between the two tenth conductive layers.

In one embodiment of the present invention, the third conductive layer further includes two second trace portions, each of which is separated from the first end of each of the first trace portions of the third conductive layer, respectively, and in direct contact with and connected to the second conductive layer, to form a part of the windings of the magnetic element.

In one embodiment of the present invention, the third conductive layer further includes two third trace portions, each of which is separated from the second end of each of the first trace portions of the third conductive layer, respectively, and in direct contact with and connected to one of the tenth conductive layers, to form a part of the windings of the magnetic element.

In one embodiment of the present invention, the third conductive layer further includes a fourth trace portion which is disposed between the two third trace portions of the third conductive layer and separated from the third trace portions of the third conductive layer, and wherein the fourth trace portion of the third conductive layer is in direct contact with and connected to the eleventh conductive layer, to form a part of the windings of the magnetic element.

In one embodiment of the present invention, the windings of the magnetic element include a plurality of layers of sub-windings which are wound sequentially around each of the magnetic columns from inside to outside, with two outermost-layer sub-windings disposed on the outermost layers away from the two magnetic columns, respectively, and wherein the eleventh conductive layer is configured to form a common winding portion of the two outermost-layer sub-windings.

In one embodiment of the present invention, a portion of the windings of the magnetic element on the outermost side of the magnetic element is manufactured by a board edge metallization process.

In one embodiment of the present invention, the windings of the magnetic element include a plurality of layers of sub-windings with at least three layers of the sub-windings wound sequentially around each of the magnetic columns from inside to outside, and wherein one of two layers of the sub-windings which are disposed closest to each of the magnetic column is configured to form primary sub-windings of the magnetic element.

In one embodiment of the present invention, the magnetic element further includes a first sub-substrate which is configured to form the first wiring region, the first conductive layer and the second conductive layer are disposed on the opposite surface of the first sub-substrate.

In one embodiment of the present invention, the magnetic element further includes a second sub-substrate which is configured to form the third wiring region, the two ninth conductive layers are disposed on the opposite surface of the second sub-substrate.

In order to achieve the object, the present invention further provides a method for manufacturing a magnetic element, the magnetic element including a first assembly, a first sub-substrate and a magnetic column, the method for manufacturing the magnetic element including the following steps: providing a first assembly, a first sub-substrate and a magnetic column; a step S1 of forming a first accommodating slot in the first assembly, wherein the first accommodating slot is configured to hold the first sub-substrate, to form a first wiring region including a first conductive layer and a second conductive layer; a step S2 of forming a first dielectric layer on an upper surface of the first assembly, and forming a second dielectric layer on a lower surface of the first assembly, wherein the first dielectric layer, the second dielectric layer and the first assembly form a second assembly; a step S3 of exposing lower end surfaces of the first conductive layer and the second conductive layer; and a step S4 of forming a third conductive layer on a lower surface of the second assembly, wherein one end of a first trace portion of the third conductive layer is in direct contact with and connected to the first conductive layer, to form a part of windings of the magnetic element.

In another embodiment of the present invention, in the step S3, the lower end surfaces of the first conductive layer and the second conductive layer are exposed by performing a scrubbing process on the lower surface of the second assembly.

In another embodiment of the present invention, the step S4 further includes: forming a first blind via in the second assembly, wherein the first blind via is connected to the first conductive layer; and forming a fourth conductive layer on an upper surface of the second assembly, wherein one end of a first trace portion of the fifth conductive layer is connected to the first conductive layer through the first blind via, to form a part of the windings of the magnetic element.

In another embodiment of the present invention, the step S4 further includes: splitting the third conductive layer to form a second trace portion of the third conductive layer, wherein the second trace portion of the third conductive layer is in direct contact with and connected to the second conductive layer, to form a part of the windings of the magnetic element.

In another embodiment of the present invention, the step S3 further includes: exposing upper end surfaces of the first conductive layer and the second conductive layer, wherein the step S4 further includes: forming a fourth conductive layer on an upper surface of the second assembly, and splitting the fourth conductive layer to form a first trace portion and a second trace portion of the fourth conductive layer, and wherein one end of the first trace portion of the fourth conductive layer is in direct contact with and connected to the first conductive layer, and wherein the second trace portion of the fourth conductive layer is in direct contact with and connected to the second conductive layer, to form a part of the windings of the magnetic element.

In another embodiment of the present invention, after the step S4, the method for manufacturing the magnetic element further includes the following steps: a step S5 of forming a third dielectric layer on a lower surface of the third conductive layer, and forming a fourth dielectric layer on an upper surface of the fourth conductive layer, wherein the third dielectric layer, the fourth dielectric layer and the second assembly are formed to be an integral body defined as a third assembly; a step S6 of forming a second blind via in each of the third dielectric layer and the fourth dielectric layer, wherein the second blind via in the third dielectric layer is correspondingly connected to the second trace portion of the third conductive layer, and the second blind via in the fourth dielectric layer is correspondingly connected to the second trace portion of the fourth conductive layer; a step S7 of forming an inner fifth conductive layer on an upper surface of the third assembly, and forming an inner sixth conductive layer on a lower surface of the third assembly, wherein the inner fifth conductive layer is connected to the second trace portion of the fourth conductive layer through the second blind via in the fourth dielectric layer, and the inner sixth conductive layer is connected to the second trace portion of the third conductive layer through the second blind via in the third dielectric layer; and a step S8 of forming a portion of the windings of the magnetic element that is located on an outer side of the magnetic element.

In another embodiment of the present invention, before the step S1, the method for manufacturing the magnetic element further includes the following steps: a step S01 of providing a core board in which a second accommodating slot is formed, wherein the magnetic column is mounted within the second accommodating slot; and a step S02 of forming an upper dielectric layer on an upper surface of the core board, and forming a lower dielectric layer on a lower surface of the core board, wherein the upper dielectric layer, the lower dielectric layer and the core board form the first assembly.

In another embodiment of the present invention, in the step S01, an outer surface of the magnetic column is provided with a coating.

In another embodiment of the present invention, before the step S1, the method for manufacturing the magnetic element further includes the following steps: a step S01 of providing a core board in which a second accommodating slot is formed, wherein a pad is mounted within the second accommodating slot; and a step S02 of forming an upper dielectric layer on an upper surface of the core board, and forming a lower dielectric layer on a lower surface of the core board, wherein the upper dielectric layer, the lower dielectric layer and the core board form the first assembly, and wherein after the step S8, the method for manufacturing the magnetic element further includes the following steps: a step S9 of removing the pad from the second accommodating slot, to form an accommodating space; and a step S10 of mounting the magnetic column within the accommodating space.

In another embodiment of the present invention, the first assembly is a core board, wherein two first accommodating slots are formed, each in a respective one of two sides of the first assembly, and two first sub-substrates are provided, each disposed within a respective one of the two first accommodating slots, to form two first wiring regions, wherein each end of the first trace portion of the third conductive layer is in direct contact with and connected to the first conductive layer, wherein the third conductive layer further includes two second trace portions which are arranged close to two ends of the first trace portion of the third conductive layer separately and in direct contact with and connected to the second conductive layer, wherein both ends of the first trace portion of the fourth conductive layer are in direct contact with and connected to the first conductive layer, and the fourth conductive layer further includes two second trace portions which are arranged close to two ends of the first trace portion of the fourth conductive layer separately and in direct contact with and connected to the second conductive layer, to form a part of the windings of the magnetic element.

In another embodiment of the present invention, after the step S4, the method for manufacturing the magnetic element further includes the following steps: a step S5 of forming a second accommodating slot in a center portion of the second assembly; a step S6 of providing a cover plate which is disposed above the second assembly and has a lower surface to form an accommodating space with the second accommodating slot; a step S7 of forming two first blind vias and two second blind vias in the cover plate, wherein each of the first blind vias in the cover plate is correspondingly connected to one first trace portion of the fourth conductive layer, and each of the second blind vias in the cover plate is correspondingly connected to one of the second trace portions of the fourth conductive layer; and a step S8 of forming an inner fifth conductive layer on an upper surface of the cover plate, and splitting the inner fifth conductive layer such that the inner fifth conductive layer includes one first trace portion and two second trace portions, wherein each end of the first trace portion of the inner fifth conductive layer is connected to one first trace portion of the fourth conductive layer through one of the first blind vias, respectively, and wherein each of the second trace portions of the inner fifth conductive layer is connected to one of the second trace portions of the fourth conductive layer through one of the second blind vias, to form a part of the windings of the magnetic element.

In another embodiment of the present invention, after the step S8, the method for manufacturing the magnetic element further includes the following steps: a step S9 of forming a third dielectric layer on a lower surface of the third conductive layer, and forming a fourth dielectric layer on an upper surface of the inner fifth conductive layer, wherein the third dielectric layer, the fourth dielectric layer, the cover plate and the second assembly are formed to be an integral body defined as a third assembly; a step S10 of forming two third blind vias in the third dielectric layer, and forming two fourth blind vias in the fourth dielectric layer, wherein each of the third blind vias is correspondingly connected to one of the second trace portions of the third conductive layer, and each of the fourth blind vias is correspondingly connected to one of the second trace portions of the inner fifth conductive layer; and a step S11 of forming an inner sixth conductive layer on a lower surface of the third dielectric layer, and forming an outer fifth conductive layer on an upper surface of the fourth dielectric layer, wherein each end of the inner sixth conductive layer is connected to one of the second trace portions of the third conductive layer through one of the third blind vias, and each end of the outer fifth conductive layer is connected to one of the second trace portions of the inner fifth conductive layer through one of the fourth blind vias; a step S12 of forming a portion of the windings of the magnetic element that is located on an outer side of the magnetic element; and a step S13 of mounting the magnetic column within the accommodating space.

In another embodiment of the present invention, a portion of the magnetic element other than the first sub-substrate forms a second wiring region.

In another embodiment of the present invention, the magnetic element further includes a second sub-substrate, wherein the number of the first sub-substrates is at least two, wherein the number of the first accommodating slots is at least two, wherein the number of the first wiring regions is at least two, wherein the number of the magnetic columns is at least two, wherein the two magnetic columns are separately disposed between the two first wiring regions, with the second sub-substrate interposed between the two magnetic columns, wherein the step S1 further includes the following steps: forming on the first assembly a third accommodating slot for holding the second sub-substrate, to form a third wiring region including two ninth conductive layers which are disposed in two sides of the third wiring region, respectively, wherein each of the magnetic columns is interposed between one of the ninth conductive layers and the one first conductive layer, wherein the step S3 further includes the following steps: exposing a lower end surface of the ninth conductive layer, and wherein the step S4 further includes the following steps: splitting the third conductive layer to form two first trace portions of the third conductive layer, wherein one end of each of the first trace portions of the third conductive layer is in direct contact with and connected to the one first conductive layer, and the other end is in direct contact with and connected to the one of the ninth conductive layers.

In order to achieve the object, the present invention even further provides a substrate, including: a first wiring region including a first conductive layer and a second conductive layer which are arranged along a first direction; and a second wiring region including a third conductive layer and a fourth conductive layer which are arranged along a second direction perpendicular to the first direction and are disposed in opposite sides of the second wiring region, respectively, wherein the third conductive layer includes a first trace portion having one end in direct contact with and connected to the first conductive layer.

The additional aspects and advantages of the present invention are partially explained in the below description, and partially becoming apparent from the description, or may be obtained through the practice of the present invention.

BRIEF DESCRIPTION OF THE DRAWINGS

The exemplary embodiments are described in details with reference to the accompanying drawings, through which the above and other features and advantages of the present invention will become more apparent.

DETAILED EMBODIMENTS OF THE INVENTION

Figure 1A:
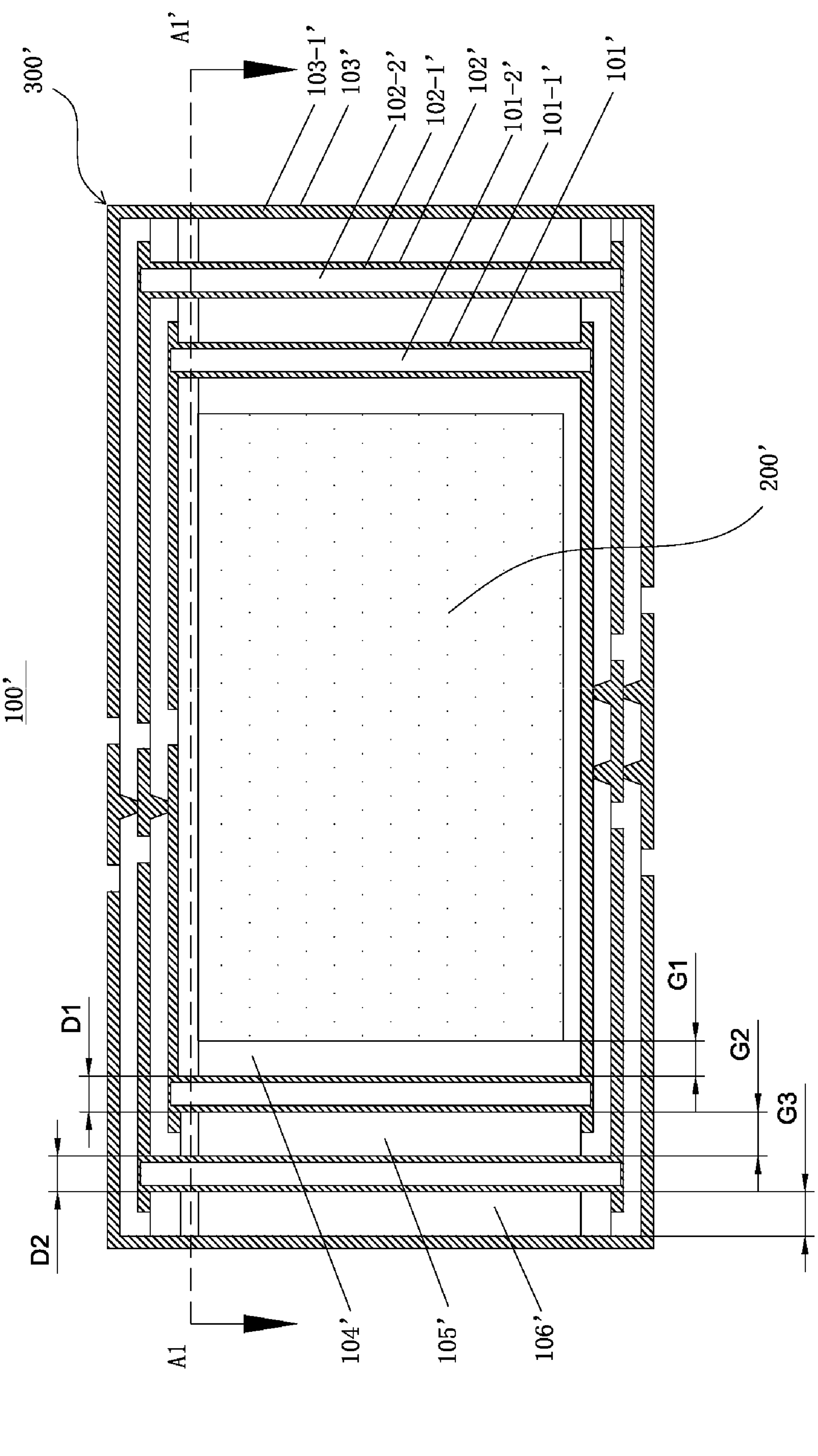
FIG. 1A is a sectional diagram of a magnetic element in the related art taken in a thickness direction.

The exemplary embodiments will now be described more fully with reference to the accompanying drawings. However, the exemplary embodiments may be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative phrases, such as, "upper" or "lower", to describe a relative relation of one assembly of the sign over another assembly. It is understood that if the device of the sign is reversed upside down, the "upper" assembly will become a "lower" assembly. In addition, the terms "first", "second" and the like in the claims are only used as signs, instead of numeral limitations to objects.

First Embodiment

Figure 2A:
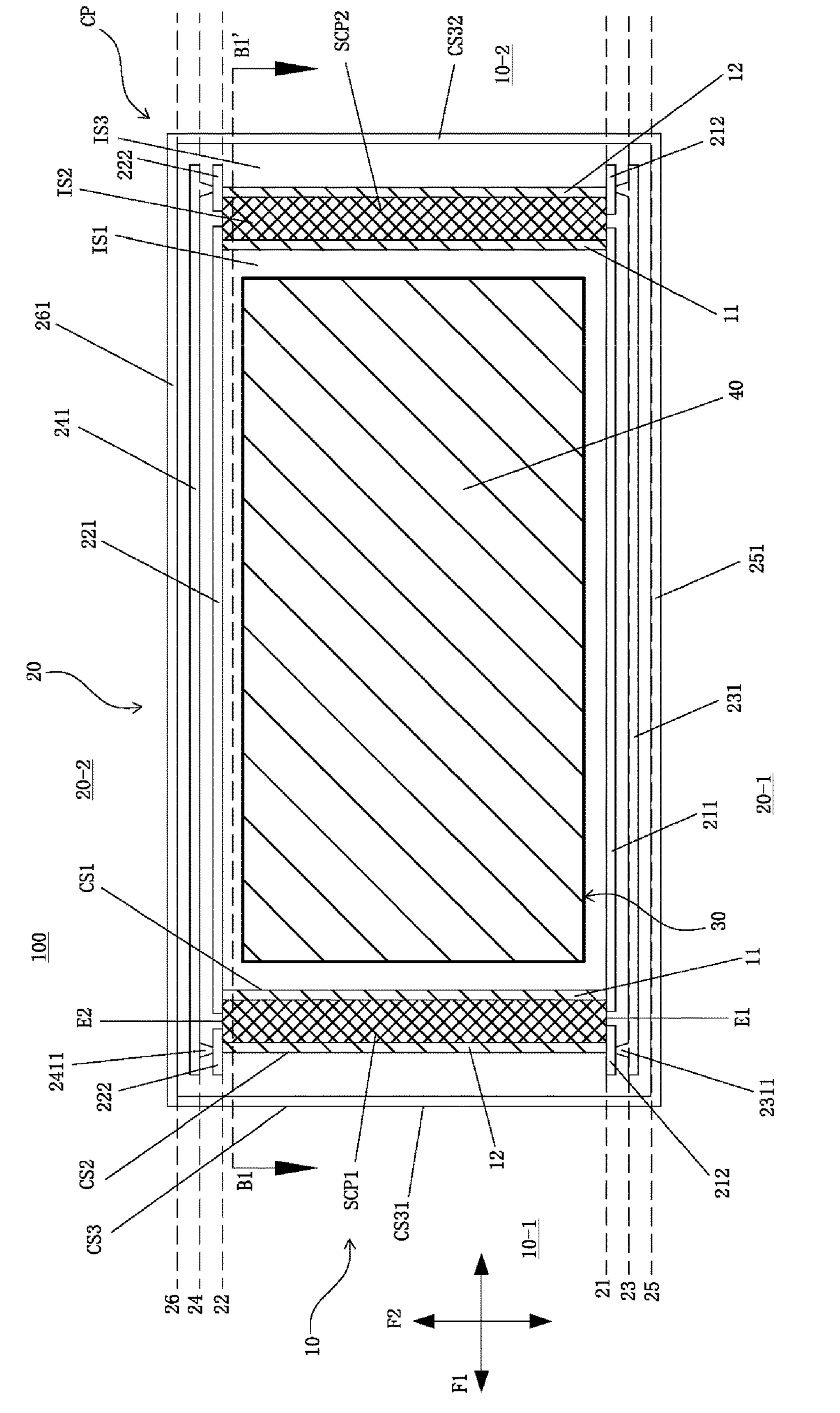
FIG. 2A is a sectional diagram of a magnetic element according to a first embodiment of the present invention taken in a thickness direction.
Figure 2B:
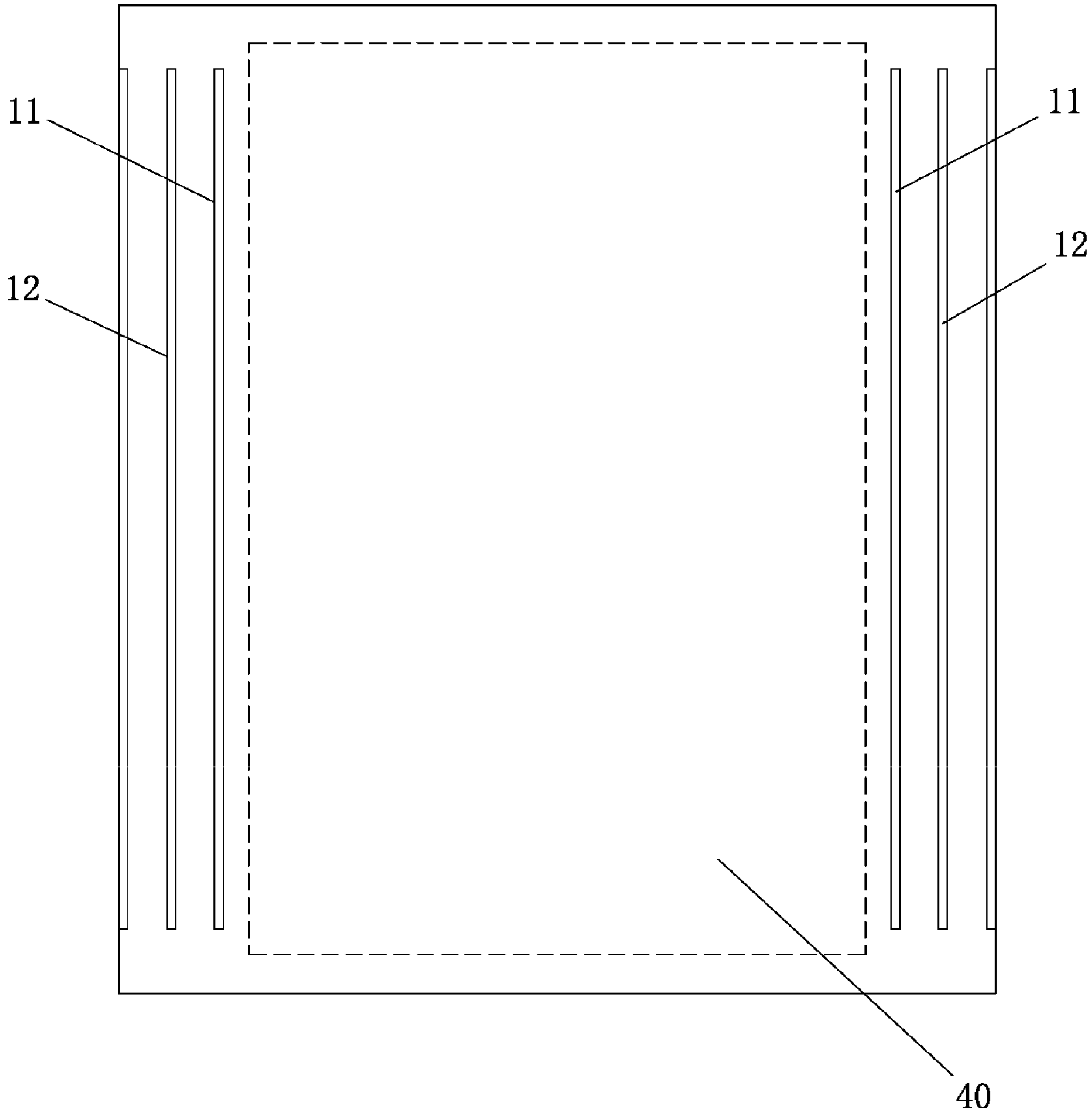
FIG. 2B is a top view taken along a direction of a sectional line B1-B1' in FIG. 2A.

FIGS. 2A to 2B illustrate a structure of a magnetic element 100 according to a first embodiment of the present invention. As shown in FIGS. 2A to 2B, the magnetic element 100 mainly includes a first wiring region 10, a second wiring region 20, an accommodating space 30 and a magnetic column 40. The first wiring region 10 at least includes a first conductive layer 11 and a second conductive layer 12 which are arranged along a first direction F1. The second wiring region 20 at least includes a third conductive layer 21 and a fourth conductive layer 22 which are arranged along a second direction F2 perpendicular to the first direction F1, and the third conductive layer 21 and the fourth conductive layer 22 are disposed in opposite sides of the second wiring region 20, respectively. For example, the third conductive layer 21 may be disposed in a lower second wiring region 20-1, and the fourth conductive layer 22 may be disposed in an upper second wiring region 20-2. The accommodating space 30 is disposed between the third conductive layer 21 and the fourth conductive layer 22. The first conductive layer 11 and the third conductive layer 21 are disposed close to the accommodating space 30, and the second conductive layer 12 is disposed on one side of the first conductive layer 11 away from the accommodating space 30. The magnetic column 40 is disposed within the accommodating space 30. The third conductive layer 21 may include a first trace portion 211, one end of the first trace portion 211 of the third conductive layer 21 is in direct contact with and connected to the first conductive layer 11, i.e., connected to a first end E1 of the first conductive layer 11, to form a part of windings of the magnetic element 100, for example, forming a part of a first winding CS1.

In some embodiments, the magnetic element 100 includes two first wiring regions 10, for example, a left first wiring region 10-1 on a left side of the magnetic column 40 and a right first wiring region 10-2 on a right side of the magnetic column 40. Each of the left first wiring region 10-1 and the right first wiring region 10-2 includes one first conductive layer 11 and one second conductive layer 12. Moreover, two ends of the first trace portion 211 of the third conductive layer 21 are in direct contact with and connected to the first conductive layers 11 in the left first wiring region 10-1 and the right first wiring region 10-2, respectively. That is, each end of the third conductive layer 21 is in direct contact with and connected to one of the first conductive layers 11.

In some embodiments, the fourth conductive layer 22 may include a first trace portion 221, one end of the first trace portion 221 of the fourth conductive layer 22 is in direct contact with and connected to the first conductive layer 11, i.e., connected to a second end E2 of the first conductive layer 11, to form a part of the windings of the magnetic element 100, for example, forming a part of the first winding CS1. In the embodiment, two ends of the first trace portion 221 of the fourth conductive layer 22 are in direct contact with and connected to the first conductive layers 11 in the left first wiring region 10-1 and the right first wiring region 10-2, respectively. In this way, the first trace portion 211 of the third conductive layer 21, the first conductive layer 11 in the left first wiring region 10-1, the first trace portion 221 of the fourth conductive layer 22, and the first conductive layer 11 in the right first wiring region 10-2 may be connected end to end, to form the first winding CS1, i.e., forming a first-turn metal layer close to the magnetic column 40.

In some embodiments, the third conductive layer 21 further include a second trace portion 212 which is arranged close to one end of the first trace portion 211 of the third conductive layer 21 and separated from the first trace portion 211 of the third conductive layer 21. The second trace portion 212 of the third conductive layer 21 may be in direct contact with and connected to the second conductive layer 12, to form a part of the windings of the magnetic element 100, for example, forming a part of a second winding CS2. In the embodiment, the third conductive layer 21 includes two second trace portions 212 which are arranged close to two ends of the first trace portion 211 of the third conductive layer 21, respectively, and each separated from the first trace portion 211 of the third conductive layer 21. One of the second trace portions 212 of the third conductive layer 21 is in direct contact with and connected to the second conductive layer 12 of the left first wiring region 10-1, and the other one of the second trace portions 212 of the third conductive layer 21 is in direct contact with and connected to the second conductive layer 12 of the right first wiring region 10-2, to form a part of the windings of the magnetic element 100, for example, forming a part of the second winding CS2.

In some embodiments, the fourth conductive layer 22 may further include a second trace portion 222 which is arranged close to one end of the first trace portion 221 of the fourth conductive layer 22 and separated from the first trace portion 221 of the fourth conductive layer 22. The second trace portion 222 of the fourth conductive layer 22 may be in direct contact with and connected to the second conductive layer 12, to form a part of the windings of the magnetic element 100, for example, forming a part of the second winding CS2. In the embodiment, the fourth conductive layer 22 includes two second trace portions 222 which are arranged close to two ends of the first trace portion 221 of the fourth conductive layer 22 respectively, and each separated from the first trace portion 221 of the fourth conductive layer 22. One of the two second trace portions 222 of the fourth conductive layer 22 is in direct contact with and connected to the second conductive layer 12 of the left first wiring region 10-1, and the other one of the two second trace portions 222 of the fourth conductive layer 22 is in direct contact with and connected to the second conductive layer 12 of the right first wiring region 10-2, to form a part of the windings of the magnetic element 100, for example, forming a part of the second winding CS2.

In some embodiments, the second wring region 20 may further include at least one fifth conductive layer which is disposed on one side of the fourth conductive layer 22 away from the third conductive layer 21, for example, the fifth conductive layer is disposed in the upper second wiring region 20-2. In the embodiment shown in FIG. 2A, the at least one fifth conductive layer, for example, may include one inner fifth conductive layer 24 and at least one outer fifth conductive layer 26. The at least one outer fifth conductive layer 26 is disposed on one side of the inner fifth conductive layer 24 away from the fourth conductive layer 22. The inner fifth conductive layer 24 may be connected to the second trace portion 222 of the fourth conductive layer 22 through a blind via 2411, to form a part of the windings of the magnetic element 100, for example, forming a part of the second winding CS2. In the embodiment shown in FIG. 2A, the outer fifth conductive layer 26 has one layer, and serves as the outermost conductive layer, to form a part of the windings of the magnetic element 100, for example, forming a part of a third winding CS3. Of course, it is understood that in other embodiments, the outer fifth conductive layer 26 may alternatively have several layers, but the present invention is not limited thereto.

In some embodiments, the second wiring region 20 further includes at least one sixth conductive layer which is disposed on one side of the third conductive layer 21 away from the fourth conductive layer 22, for example, the sixth conductive layer is disposed in the lower second wiring region 20-1. In the embodiment shown in FIG. 2A, the at least one sixth conductive layer, for example, may include one inner sixth conductive layer 23 and at least one outer sixth conductive layer 25. The at least one outer sixth conductive layer 25 is disposed on one side of the inner sixth conductive layer 23 away from the third conductive layer 21. The inner sixth conductive layer 23 may be connected to the second trace portion 212 of the third conductive layer 21 through a blind via 2311, to form a part of the windings of the magnetic element 100, for example, forming a part of the second winding CS2. In the embodiment shown in FIG. 2A, the outer sixth conductive layer 25 has one layer, and serves as the outermost conductive layer, to form a part of the windings of the magnetic element 100, for example, forming a part of the third winding CS3. Of course, it is understood that in other embodiments, the outer sixth conductive layer 25 may alternatively have several layers, but the present invention is not limited thereto.

In the embodiment shown in FIG. 2A, four conductive layers, i.e., the second conductive layer 12 in the left first wiring region 10-1, the inner fifth conductive layer 24, the second conductive layer 12 in the right first wiring region 10-2, and the inner sixth conductive layer 23, may be connected to form the second winding CS2 of the magnetic element 100 through the second trace portion 212 of the third conductive layer 21, the second trace portion 222 of the fourth conductive layer 22, and the blind vias 2311 and 2411, i.e., forming a second-turn metal layer in the middle.

In the embodiment shown in FIG. 2A, the third winding CS3 on the outermost side of the magnetic element 100 may be manufactured by a board edge metallization process. The third winding CS3 includes one outer fifth conductive layer 26, one outer sixth conductive layer 25, a first vertical copper foil CS31 and a second vertical copper foil CS32 that are connected together.

In the embodiment shown in FIG. 2A, a first insulating layer IS1, the first winding CS1, a second insulating layer IS2, the second winding CS2, a third insulating layer IS3 and the third winding CS3 may be provided wound around the magnetic column 40 from inside to outside.

In some embodiments, in the embodiment shown in FIG. 2A, the first conductive layer 11 and the second conductive layer 12 in each of the left first wiring region 10-1 and the right first wiring region 10-2 are manufactured by using a whole double side copper-clad board. For example, the first conductive layer 11 and the second conductive layer 12 in the left first wiring region 10-1 are formed by using a first double side copper-clad sub-substrate SCP1, and the first conductive layer 11 and the second conductive layer 12 in the right first wiring region 10-2 are formed by using a first double side copper-clad sub-substrate SCP2. In some embodiments, each of the first double side copper-clad sub-substrates SCP1 and SCP2 includes one double side copper-clad insulating plate, such that the insulating plate for the first sub-substrates SCP1 and SCP2 may form a part of the second insulating layer IS2.

Figure 2D:
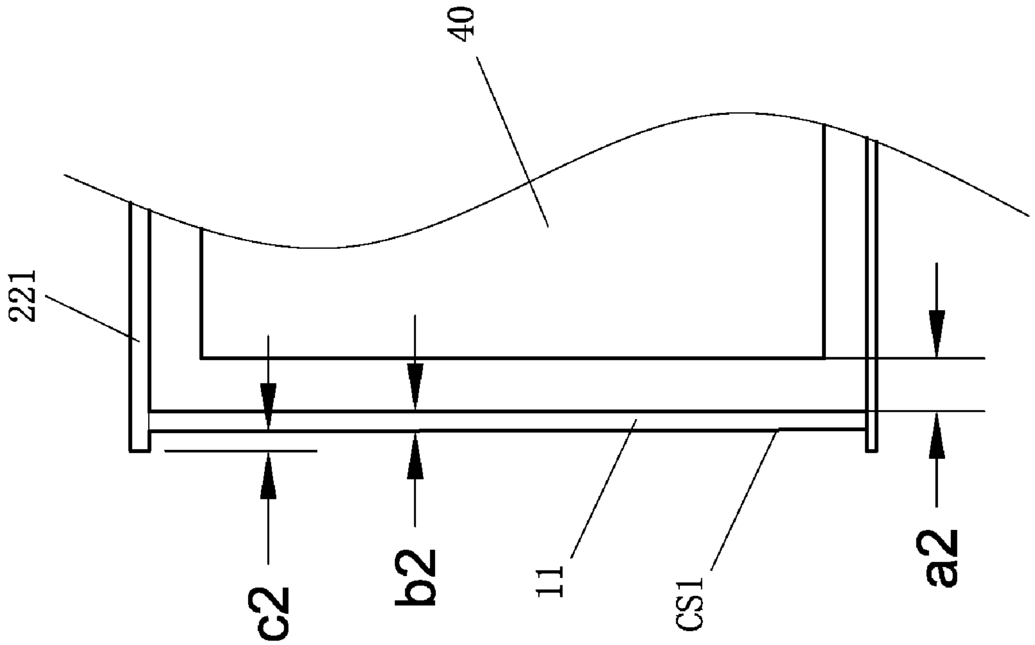
FIG. 2D illustrates the width size of the first winding on the left side of the magnetic column in FIG. 2A.
Figure 2C:
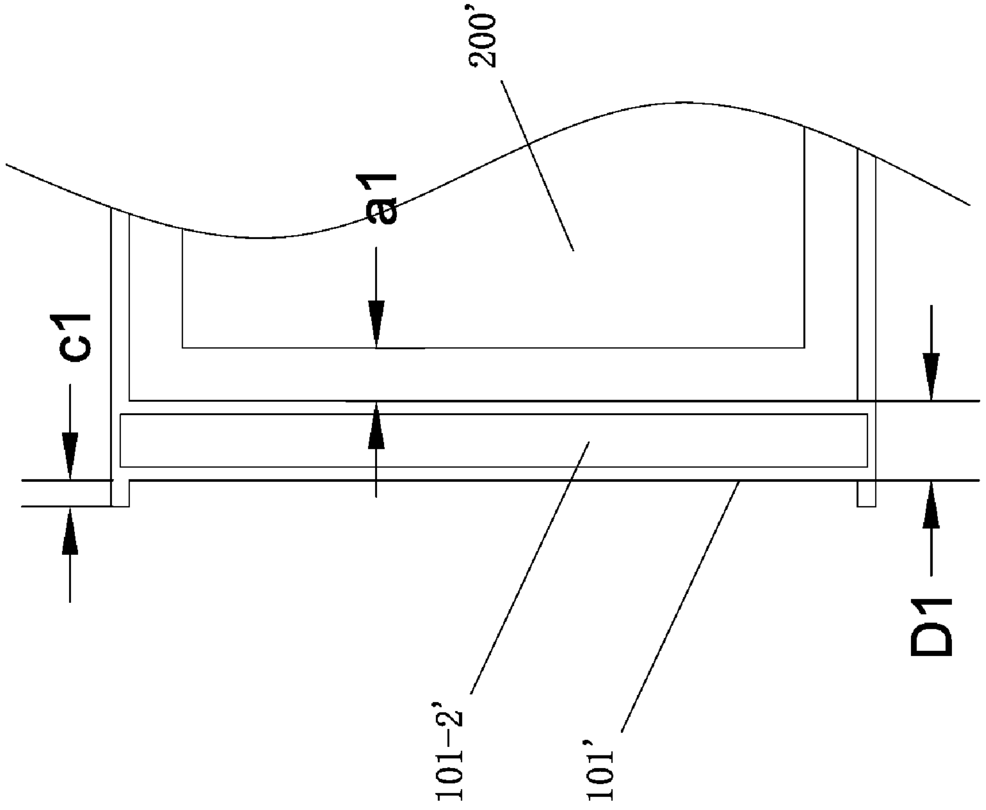
FIG. 2C illustrates a width size of a first winding on a left side of a magnetic core in FIG. 1A.

The structure of the related art in FIG. 1A and the structure of the present invention in FIG. 2A will be further compared, for example, with reference to the partial enlarged diagrams shown in FIGS. 2C and 2D. FIG. 2C illustrates the width size of a first winding 101' on the left side of the magnetic core 200' in FIG. 1A, and FIG. 2D illustrates the width size of the first winding CS1 on the left side of the magnetic column 40 in FIG. 2A. The width size of the first winding 101' in FIG. 2C includes a distance a1 between the connection hole 101-2' and the magnetic core 200', a hole diameter D1 of the connection hole 101-2', and a width c1 of a copper foil covering over the connection hole 101-2'. The width of the first winding CS1 in FIG. 2D includes a distance a2 between the first conductive layer 11 on the first sub-substrate SCP1 and the magnetic column 40, a width b2 of the first conductive layer 11 on the first sub-substrate SCP1, and a width c2 of a copper foil covering over the first conductive layer 11 on the first sub-substrate SCP1. Based on a conventional manufacture process capability of the substrate, no matter whether upper and lower copper foils (or referred to as conductive layers) above and below the magnetic column are connected via a through hole or a first conductive layer on a first sub-substrate, it is considered that structural dimensions a1=a2, and c1=c2. The structures in FIGS. 2C and 2D are mainly different in that FIG. 2C is a structure with a through hole, and FIG. 2D is a structure with a metal wiring layer. Assuming that a thickness of the copper foils for desired performance of conducting current is 2 oz, by using the structure with the metal wiring layer in the present invention, the first conductive layer 11 on the first sub-substrate SCP1 may be set to 2 oz, for example, a width of the first conductive layer 11 is about 0.07 mm. On the other hand, to achieve the conducting current of 2 oz in the structure with the through hole in the related art, a diameter of the through holes is required to be set to 0.4 mm so as to form a copper thickness of 2 oz within the connection holes by plating. Accordingly, the structure with the metal wiring layer according to the present invention may greatly reduce the width size of the magnetic element. The reduction in the size of the magnetic element may improve the power density. Further, if a width of the magnetic element is kept unchanged while the reduction in the size is applied to the magnetic column, a sectional area of a magnetic core may be efficiently increased, thereby reducing magnetic loss.

Figure 1B:
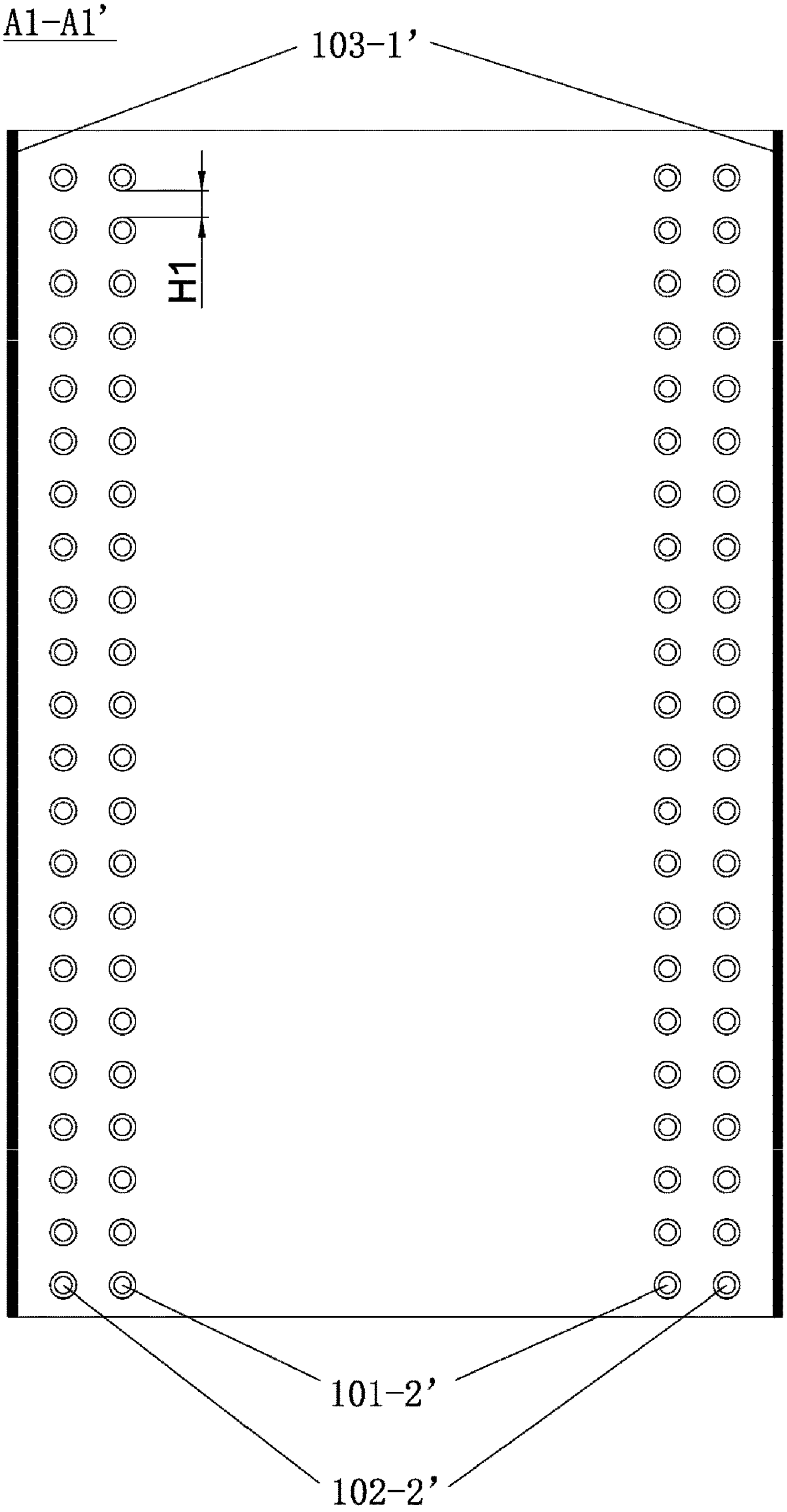
FIG. 1B is a top view taken along a direction of a sectional line A1-A1' in FIG. 1A.

By comparing FIG. 1B with FIG. 2B, it is obvious that a certain safe distance shall be kept between the through holes in the related art. on the other hand, in the present invention, the metal wiring layer is a whole copper foil structure, which may provide a rational use of space, thereby further improving current conducting capability of the magnetic element.

Figure 3:
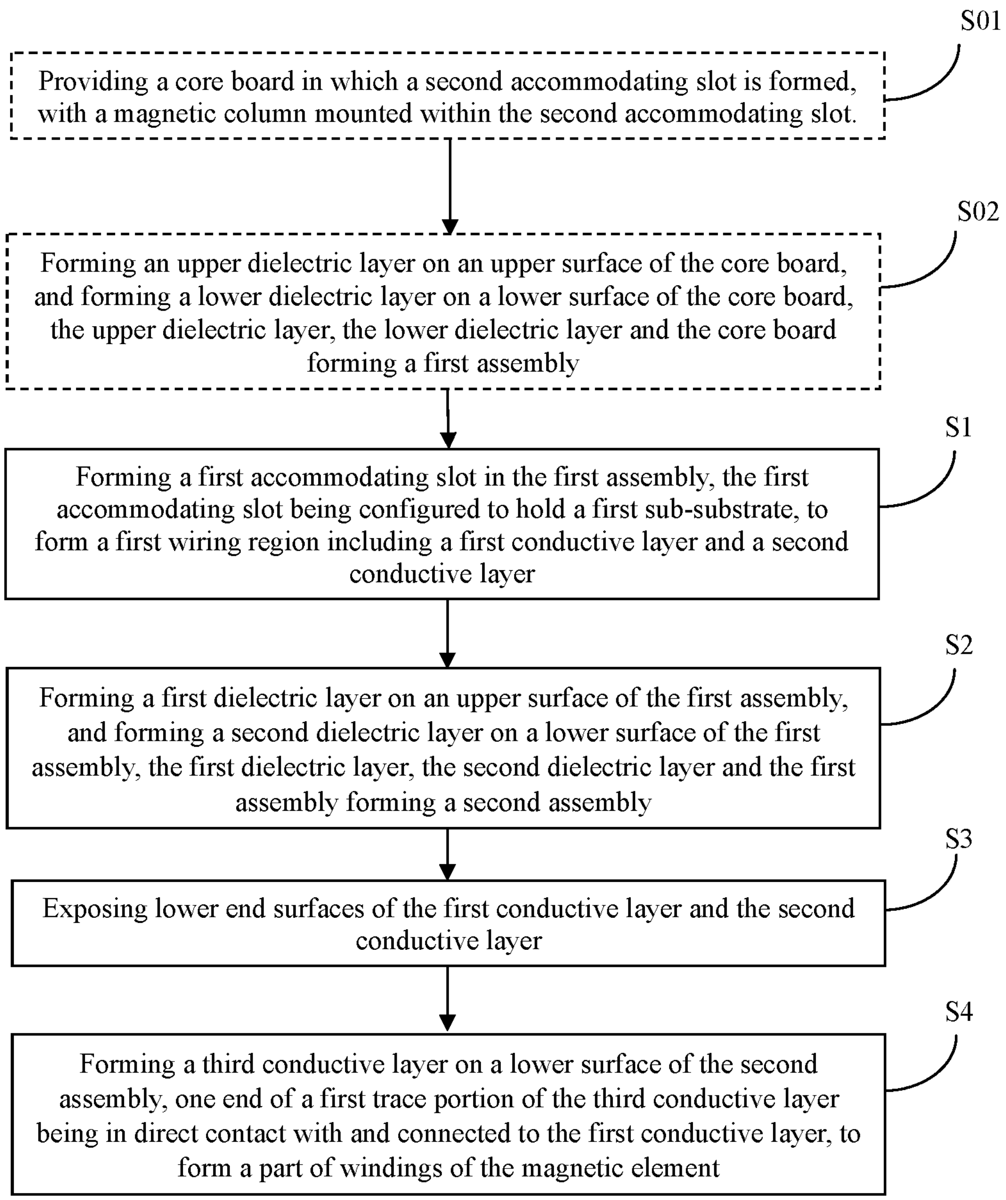
FIG. 3 is a schematic diagram of a process flow for manufacturing the magnetic element shown in FIG. 2A.

The present invention provides a method for manufacturing the magnetic element shown in FIG. 2A, in which the magnetic element includes a first assembly, a first sub-substrate and a magnetic column. The process flow of the method for manufacturing the magnetic element is shown in FIG. 3, which mainly includes the following steps.

At a step S1, a first accommodating slot is formed in the first assembly. The first accommodating slot is configured to hold the first sub-substrate, to form a first wiring region including a first conductive layer and a second conductive layer. The first accommodating slot may be formed by performing, for example, but not limited to, a slot milling process.

At a step S2, a first dielectric layer is formed on an upper surface of the first assembly, and a second dielectric layer is formed on a lower surface of the first assembly. The first dielectric layer, the second dielectric layer and the first assembly form a second assembly. The second assembly may be formed by performing, for example, but not limited to, a pressing process.

At a step S3, lower end surfaces of the first conductive layer and the second conductive layer are exposed. The lower end surfaces may be exposed by performing, for example, but not limited to, a method of performing a scrubbing process on a lower surface of the second assembly.

At a step S4, a third conductive layer is formed on the lower surface of the second assembly. One end of a first trace portion of the third conductive layer is in direct contact with and connected to the first conductive layer, to form a part of the windings of the magnetic element. The third conductive layer may be formed by performing, for example, but not limited to, a metalizing process.

In some embodiments, before the step S1, the method for manufacturing the magnetic element may further include steps S01 and S02.

At a step S01, a core board in which a second accommodating slot is formed is provided. The magnetic column is mounted within the second accommodating slot. The second accommodating slot may be formed by performing, for example, but not limited to, a slot milling process.

At a step S02, an upper dielectric layer is formed on an upper surface of the core board, and a lower dielectric layer is formed on a lower surface of the core board. The upper dielectric layer, the lower dielectric layer and the core board form the first assembly. The first assembly may be formed by performing, for example, but not limited to, a pressing process.

Further, the step S4 may further include: forming a first blind via in the second assembly by performing, for example, but not limited to, a method of drilling process, in which first blind via is connected to the first conductive layer; and forming a fourth conductive layer on an upper surface of the second assembly by performing, for example, but not limited to, a method of metalizing process, in which one end of a first trace portion of the fifth conductive layer is connected to the first conductive layer through the first blind via, to form a part of the windings of the magnetic element, for example, forming a part of the first winding.

Further, the step S4 may further include: splitting the third conductive layer to form a second trace portion of the third conductive layer by performing, for example, but not limited to, a method of etching process. The second trace portion of the third conductive layer is in direct contact with and connected to the second conductive layer, to form a part of the windings of the magnetic element, for example, the second winding.

Further, the step S3 may further include: exposing upper end surfaces of the first conductive layer and the second conductive layer by performing, for example, but not limited to, a method of a scrubbing process on an upper surface of the second assembly. The step S4 may further include: forming a fourth conductive layer on the upper surface of the second assembly by performing, for example, but not limited to, a method of metalizing process, and splitting the fourth conductive layer to form a first trace portion and a second trace portion of the fourth conductive layer by performing, for example, but not limited to, a method of etching process. One end of the first trace portion of the fourth conductive layer is in direct contact with and connected to the first conductive layer to form a part of the first winding. The second trace portion of the fourth conductive layer is in direct contact with and connected to the second conductive layer, to form a part of the windings of the magnetic element, for example, a part of the second winding.

Specifically, FIGS. 5A-5F illustrate respective stages in the process flow shown in FIG. 3.

Figure 5A:
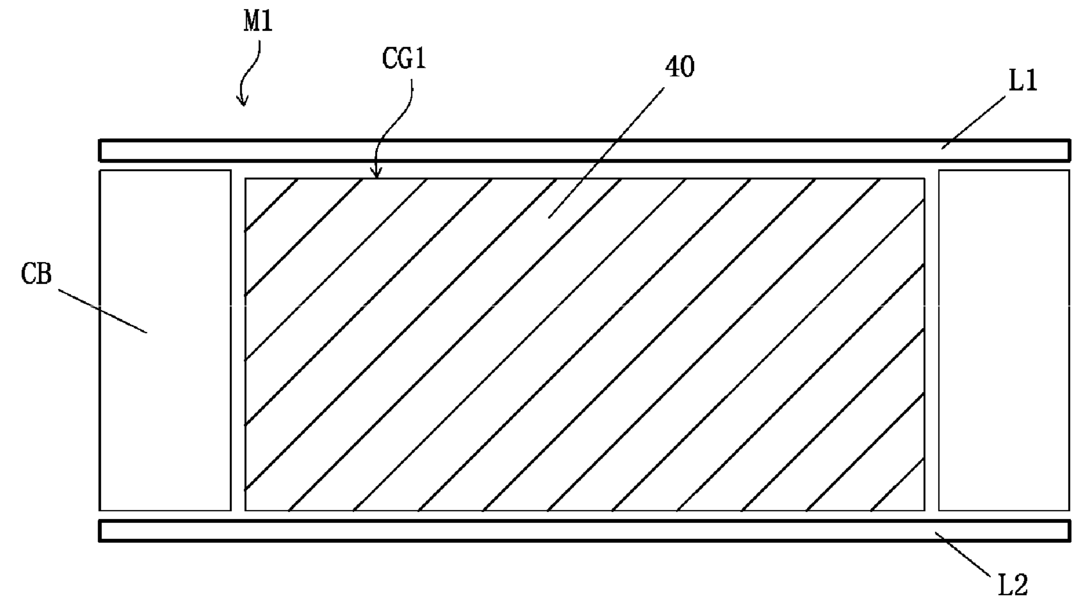
FIGS. 5A to 5F illustrate schematic diagrams of the magnetic element in respective stages in the process flow shown in FIG. 3.

At a stage 1, a magnetic core is embedded into a core board CB, as shown in FIG. 5A.

Figure 4:
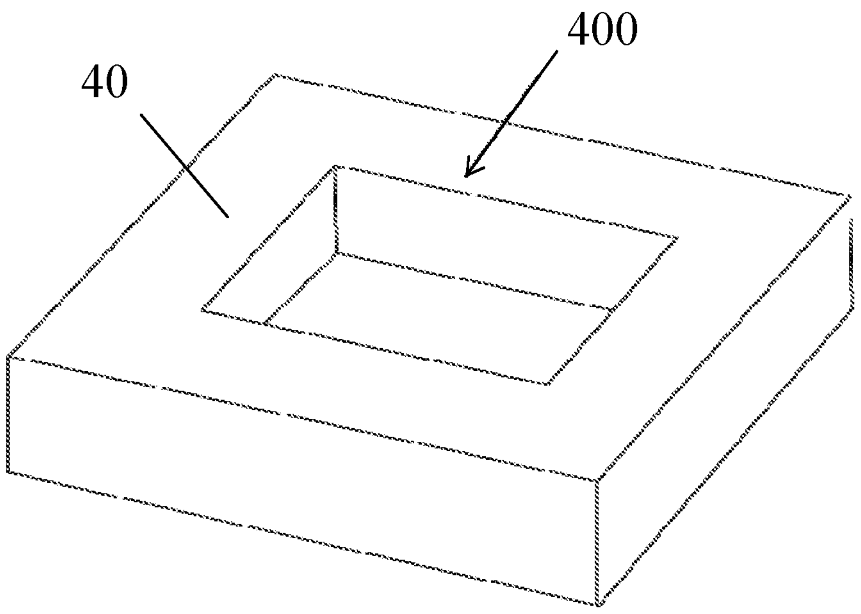
FIG. 4 is a structural diagram of a magnetic core of the magnetic element according to an embodiment of the present invention.

In the embodiment, the magnetic core may be a circular ring formed of one section of the magnetic column, or a shape formed of multiple sections of the magnetic column, such as a triangular ring, a shape of "回", a shape of "田", or other shapes. However, the specific structure of the magnetic core is not specifically limited in the embodiment. As shown in FIG. 4, the magnetic core 400 is an annular body formed by connecting at least one section of the magnetic column 40 end to end, for example, a "回"-shaped structure by connecting four sections of the magnetic column 40 end to end in which the magnetic core 400 includes a "口"-shaped window. The magnetic core 400 is formed by forming those magnetic columns 40 are to be an integral body, or by joining several separated magnetic columns 40 together. In the process of manufacturing the magnetic core, a first way is to form a window in the magnetic core, which may be directly molded using a mold when the magnetic core is formed. A second way is to performing a process on a magnetic substrate. The first way has characteristics of easy processing, while the second way has an advantage of a high precision in size, but the present invention is not limited thereto.

To facilitate introducing the manufacturing process, the following illustration is explained by using one section of the magnetic column (e.g., the magnetic column 40) of the magnetic core, but the present invention is not limited thereto.

Firstly, a core board CB made of an insulating material is provided. A slot milling process is performed on the core board CB to form an accommodating slot CG1 for holding the magnetic column 40. A dielectric layer L1 is formed on an upper surface of the magnetic column 40, and a dielectric layer L2 is formed on a lower surface of the magnetic column 40. The magnetic column 40, the dielectric layer L1, the dielectric layer L2 and the core board CB are formed to be an integral body by a pressing-fit process, as shown in FIG. 5A. Except for the magnetic column 40, remaining portions, i.e. the dielectric layer L1, the dielectric layer L2 and the core board CB as a whole are referred to as a first assembly M1.

Alternatively, considering that the material for the magnetic core is a stress sensitive material, a thickness of the core board CB is slightly higher than a thickness of the magnetic column 40, such that an external force from the pressing-fit process does not directly act on the magnetic core, thereby reducing a stress of the magnetic core.

Alternatively, the magnetic core, e.g., the magnetic column 40, may be covered with a transition layer (not shown) on its surface before it is embedded into the core board CB. The transition layer formed on the surface of the magnetic core generally has the following functions. (1) Insulating function. For example, in a case where a magnetic material having a low surface insulation resistance, such as an MnZn ferrite, is used as the magnetic material, a transition layer may be additionally applied for reducing an electric leakage between turns. For a transformer requiring an isolation, in which higher requirements for withstand voltage are required in primary and secondary sides, a transition layer may be applied to a surface of the magnetic core to satisfy safety requirements for the withstand voltage. Further, materials for the transition layer serving as the insulating layer may generally include epoxy resin, organic silicon, acetal materials, polyester materials, polyesterimid materials, polyimide materials, parylene, or the like. (2) Binding force enhancing function. For example, in a case where the binding force between the surface of the magnetic material and a subsequent metal wiring layer is not good, a binding force enhancing coating, such as epoxy resin, may be coated on the surface of the magnetic material to improve the binding force between that surface and the subsequent metal wiring layer, or performing a surface processing, such as processes for roughening, surface modification, or the like, to obtain a good binding force. (3) Stress releasing function. For example, in a case where a stress sensitivity material is selected as the magnetic material, such as a ferrite material, a stress release material, such as organic silicon or the like, may be applied in order to avoid or reduce a stress on the magnetic material, the stress is generated in the subsequent manufacturing processes and may cause degradation in magnetic performance, for example, an increasing in loss or a reduction in permeability. (4) Protection for the magnetic core. For example, it can prevent the materials directly adjacent to the magnetic core from influencing properties of the magnetic material. (5) Surface planarization function, for example, it can improve planeness of the surface of the magnetic core to facilitate successful carrying-out of the subsequent manufacturing processes.

In a possible embodiment, the transition layer (not shown) is formed on a surface of at least one section of magnetic column by spraying, impregnating, electrophoresis, electrostatic spraying, chemical vapor deposition, physical vapor deposition, sputtering, evaporation or printing.

Figure 5B:
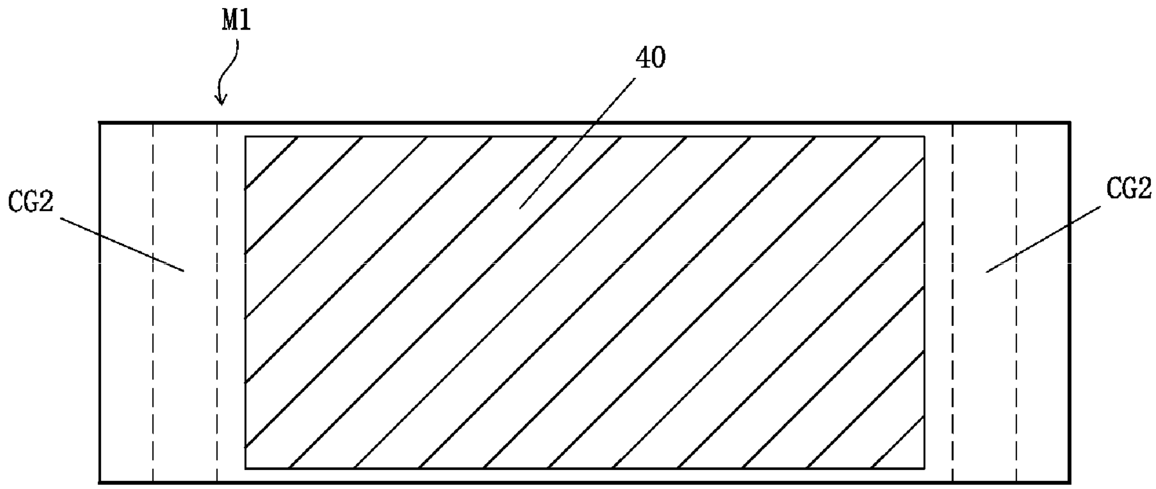
Figure 5C:
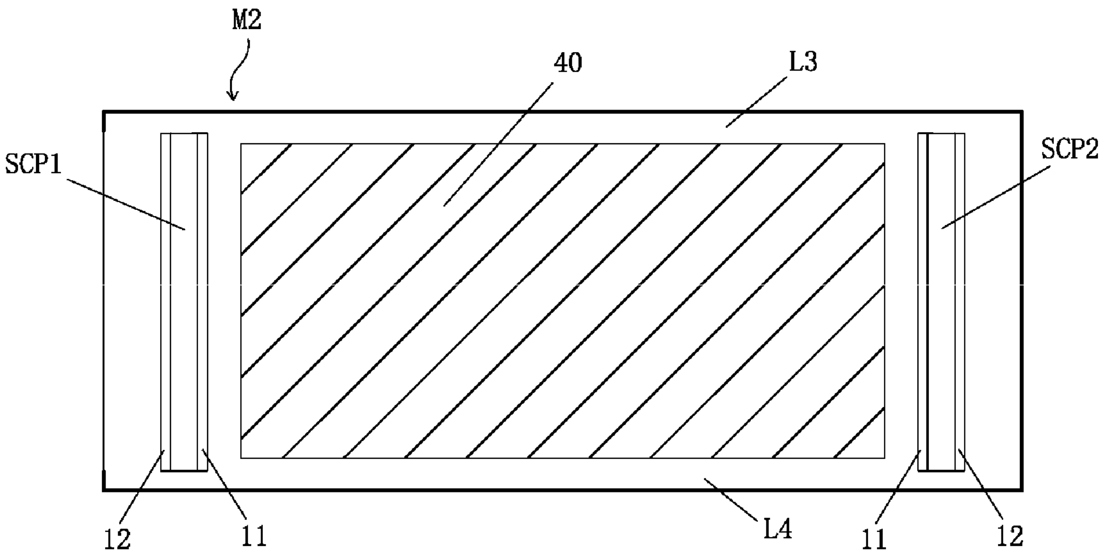

At a stage 2, first sub-substrates SCP1 and SCP2 are embedded into the first assembly M1, as shown in FIGS. 5B and 5C.

Specifically, the first conductive layer 11 and the second conductive layer 12 are provided on each of the first sub-substrates SCP1 and SCP2. Firstly, accommodating slots CG2 for holding the first sub-substrates SCP1 and SCP2 are formed on the left and right sides of the magnetic column 40 by performing the slot milling process on the first assembly M1, as shown in FIG. 5B. Next, the first sub-substrates SCP1 and SCP2 are placed into the accommodating slots CG2, with a dielectric layer L3 formed on an upper surface of the first assembly M1 and a dielectric layer L4 formed on a lower surface of the first assembly M1. The dielectric layer L3, the dielectric layer L4, the first sub-substrates SCP1 and SCP2, the magnetic column 40 and the first assembly M1 are formed to be an integral body again by curing after a high temperature in the pressing-fit process, as shown in FIG. 5C. Except for the magnetic column 40 and the first sub-substrates SCP1 and SCP2, remaining portions, i.e. the dielectric layer L3, the dielectric layer L4 and the first assembly M1 as a whole are referred to as a second assembly M2.

Figure 5D:
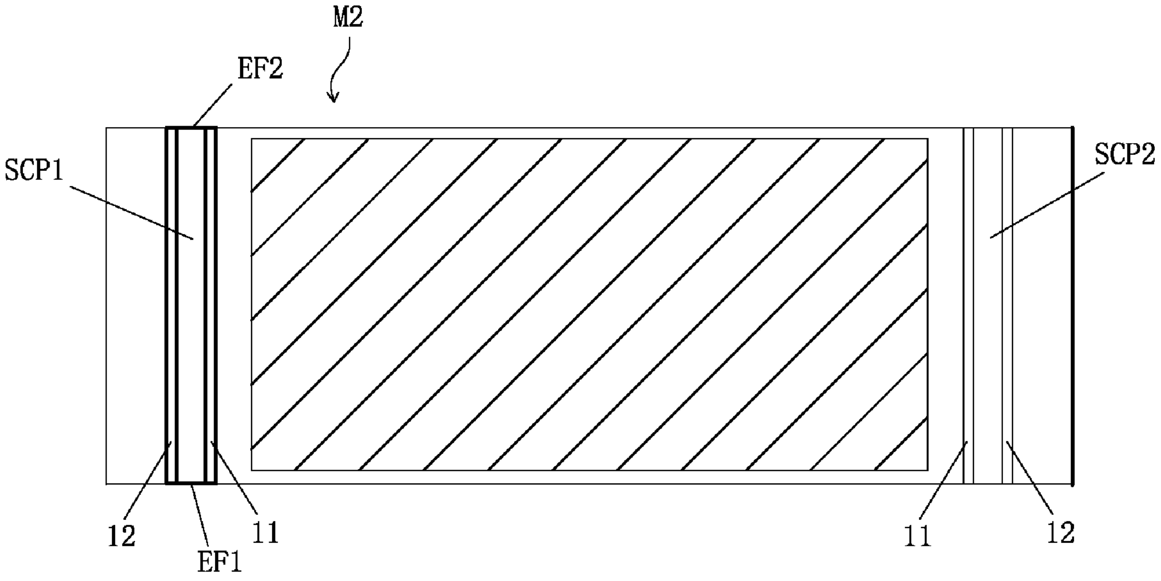
Figure 5E:
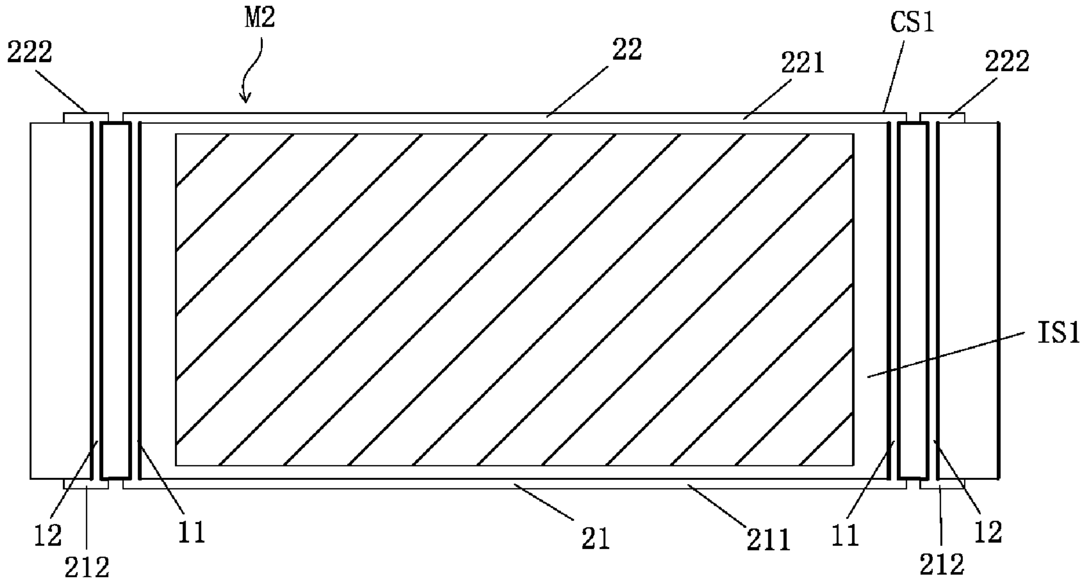

At a stage 3, a first winding CS1 is formed, as shown in FIGS. 5D and 5E.

Specifically, a first end surface EF1 and a second end surface EF2 of each of the first sub-substrates SCP1 and SCP2 are exposed by performing a scrubbing process on the second assembly M2. The first conductive layer 11 and the second conductive layer 12 are provided on each of the first sub-substrates SCP1 and SCP2, in which the first conductive layer 11 is closer to the magnetic column 40 than the second conductive layer 12. A horizontal copper foil for the second assembly M2 is formed on the exposed first end surface EF1 and the second end surface EF2 by a metalizing process, in which a portion below the magnetic column 40 is referred to as a third conductive layer 21, and a portion above the magnetic column 40 is referred to as a fourth conductive layer 22. A first trace portion 211 and a second trace portion 212 are provided on the third conductive layer 21. Also, a first trace portion 221 and a second trace portion 222 are provided on the fourth conductive layer 22. As shown in FIG. 5E, the first conductive layer 11 on each of the first sub-substrates SCP1 and SCP2 includes a first end located in the first end surface EF1 and a second end located in the second end surface EF2. The first trace portion 211 of the third conductive layer 21 includes two ends, one of the two ends is directly connected to the first end of the first conductive layer 11 on the first sub-substrate SCP1, the other one of the two ends is directly connected to a first end of the first conductive layer 11 on the first sub-substrate SCP2. Further, the first trace portion 221 of the fourth conductive layer 22 includes two ends, one of the two ends of the first trace portion 221 of the fourth conductive layer 22 is directly connected to the second end of the first conductive layer 11 on the first sub-substrate SCP1, the other one of two ends of the first trace portion 221 of the fourth conductive layer 22 is directly connected to the second end of the first conductive layer 11 on the first sub-substrate SCP2. In this way, the first winding CS1 is formed.

Figure 5F:
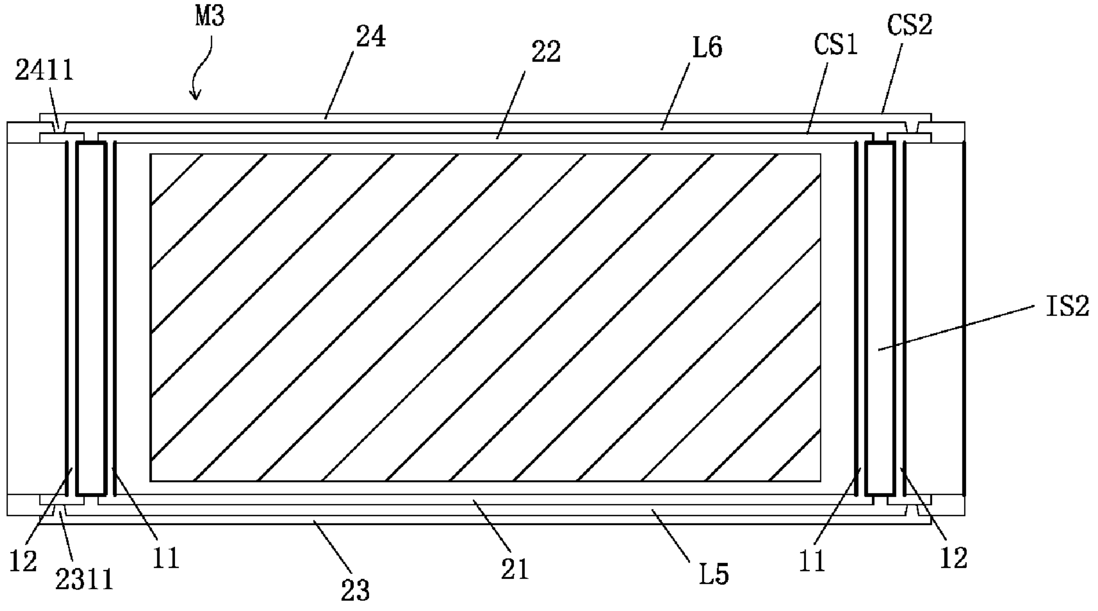

At a stage 4, a second winding CS2 is formed, as shown in FIG. 5F.

On a basis of the structure shown in FIG. 5E, the second winding CS2 shown in FIG. 5F is formed through the pressing-fit process, the drilling process and the metalizing process.

More specifically, a dielectric layer L5 is formed on a lower surface of the second assembly M2 shown in FIG. 5E, and a dielectric layer L6 is formed on an upper surface of the second assembly M2. The second assembly M2, the dielectric layer L5, and the dielectric layer L6 are formed to be an integral body again by the pressing-fit process, as shown in FIG. 5F, which is defined as a third assembly M3.

Blind vias 2311 and 2411 are formed in the dielectric layer L5 and the dielectric layer L6 by the drilling process, in which the blind via 2311 in the dielectric layer L5 is correspondingly connected to the second trace portion 212 of the third conductive layer 21, and the blind via 2411 in the dielectric layer L6 is correspondingly connected to the second trace portion 222 of the fourth conductive layer 22.

Through the metalizing process, a fifth conductive layer 24 is formed on an upper surface of the third assembly M3, and a sixth conductive layer 23 is formed on a lower surface of the third assembly M3. The fifth conductive layer 24 is connected to the second trace portion 222 of the fourth conductive layer 22 through a blind via 2411. The sixth conductive layer 23 is connected to the second trace portion 212 of the third conductive layer 21 through a blind via 2311.

Subsequently, after the dielectric layers are formed on surfaces of the fifth conductive layer 24 and the sixth conductive layer 23, a portion of the windings of the magnetic element that is located on an outer side of the magnetic element also is formed by performing, for example, but not limited to, a board edge metallization process, i.e., forming the third winding CS3 shown in FIG. 2A.

As for the winding structure in the related art shown in FIG. 1A, a sequence of manufacturing processes for the winding structure is: forming the vertical connection hole 101-2' of the first winding at first, and then forming the vertical connection hole 102-2' of the second winding. Owing to a close distance between the vertical connection hole 101-2' of the first winding and the vertical connection hole 102-2' of the second winding, a glass fiber is likely to be pulled during the drilling process, causing a microchannel to be formed between the vertical connection hole 101-2' of the first winding and the vertical connection hole 102-2' of the second winding. In such a case, the metalizing process after drilling is very likely to causes a short circuit between two layers of windings. In the embodiment of the present disclosure, vertical connection portions of the first winding CS1 and the second winding CS2 are achieved by the first conductive layer 11 and the second conductive layer 12 embedded in the first sub-substrates SCP1 and SCP2. The first sub-substrates SCP1 and SCP2 may be obtained by cutting a whole double side copper-clad board to a desired size. The double side copper-clad board has a good insulation characteristic which will not change with the embedment process. Accordingly, the problem of the short circuit between the vertical connection portions (i.e., vertical connection holes) of the first winding and the second winding in the related art can be solved.

Correspondingly, as shown in FIG. 2A, the present invention further provides a substrate CP including a first wiring region 10 and a second wiring region 20. The first wiring region 10 includes a first conductive layer 11 and a second conductive layer 12 which are arranged along a first direction F1. The second wiring region 20 includes a third conductive layer 21 and a fourth conductive layer 22, which are arranged along a second direction F2 perpendicular to the first direction F1 and are disposed in opposite sides of the second wiring region 20, respectively. Moreover, the third conductive layer 21 includes a first trace portion 211 which is in direct contact with and connected to the first conductive layer 11. The substrate CP is used as windings of the magnetic element.

In other embodiments, the fourth conductive layer 22 of the substrate CP includes a first trace portion 221 which is in direct contact with and connected to the first conductive layer 11.

In other embodiments, the second wiring region 20 of the substrate CP may further include an inner fifth conductive layer 24 and an inner sixth conductive layer 23. The fifth conductive layer 24 may be connected to the second conductive layer 12 through a blind via 2411. The sixth conductive layer 23 may be connected to the second conductive layer 12 through a blind via 2311.

In other embodiments, the second wiring region 20 of the substrate CP may further include an outer fifth conductive layer 26 and an outer sixth conductive layer 25. The first wiring region 10 may further include a first vertical copper foil CS31 and a second vertical copper foil CS32.

Figure 6A:
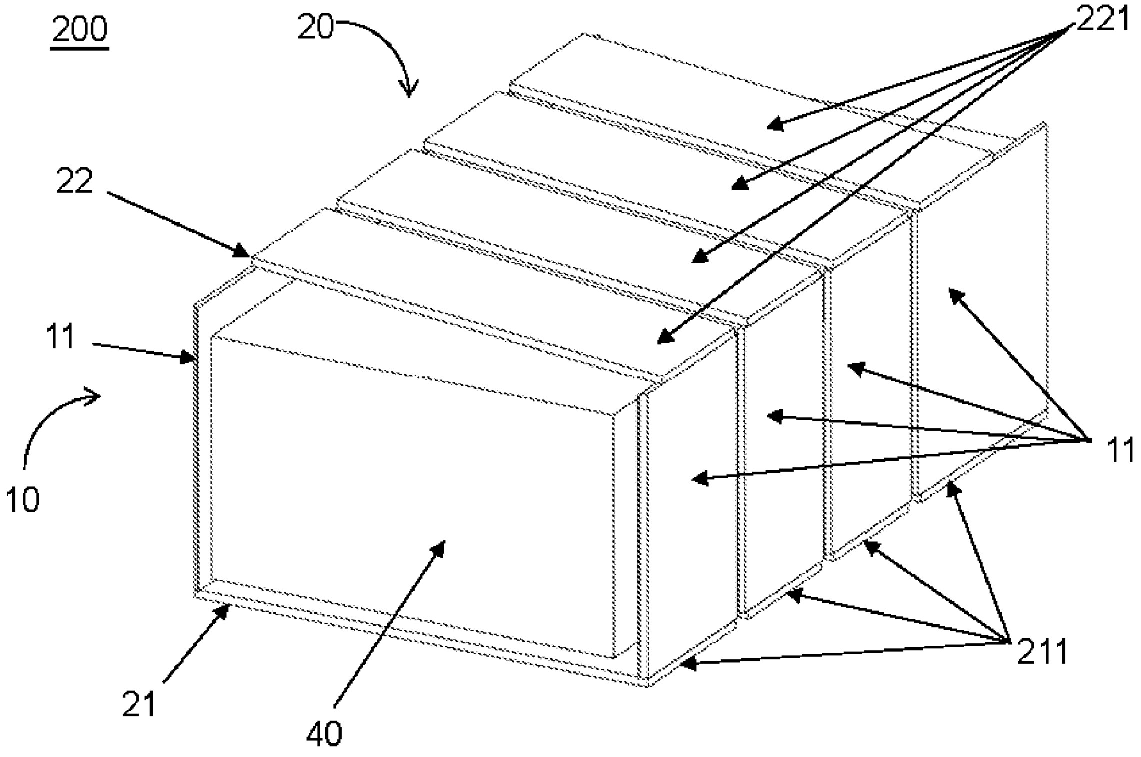
FIG. 6A is a modified structure of the magnetic element shown in FIG. 2A, in which a first wiring region includes a plurality of first conductive layers, and a second wiring region includes a plurality of third conductive layers and a plurality of fourth conductive layers.

FIG. 6A illustrates a modified structure of the magnetic element shown in FIG. 2A. The magnetic element 200 includes a first wiring region 10 and a second wiring region 20. The first wiring region 10 is formed by a first sub-substrate, and includes a plurality of first conductive layers 11. A plurality of first trace portions 211 and a plurality of second trace portions (not shown) are provided on a third conductive layer 21 in the second wiring region 20. A plurality of first trace portions 221 and a plurality of second trace portions (not shown) are provided on a fourth conductive layer 22 in the second wiring region 20. The plurality of first conductive layers 11 are connected to the plurality of first trace portions 211 on the third conductive layer 21 and the plurality of first trace portions 221 on the fourth conductive layer 22 in one-to-one correspondence. The magnetic column is interposed between the third conductive layer 21 and the fourth conductive layer 22.

Figure 6B:
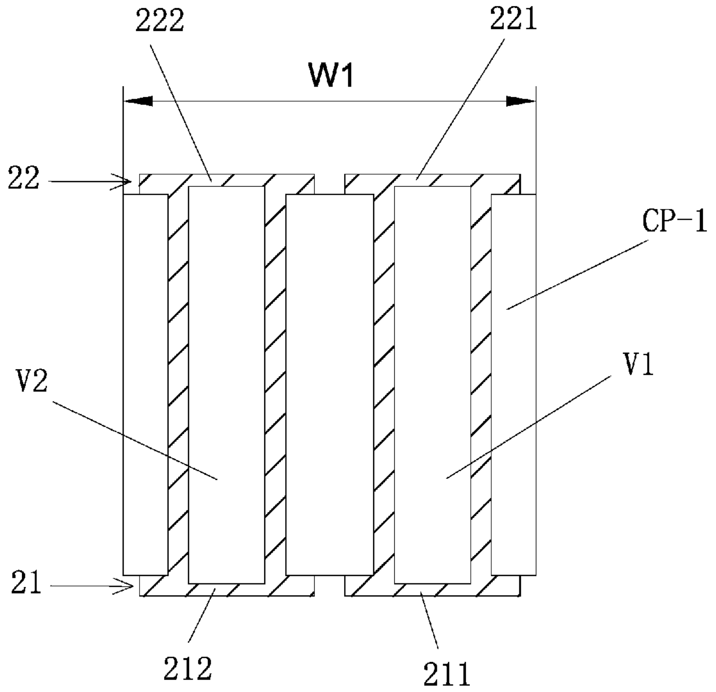
FIG. 6B (Prior Art)
FIG. 6B illustrates a structural diagram showing a comparative example in which the third conductive layer and the fourth conductive layer are electrically connected through a through hole.
Figure 6C:
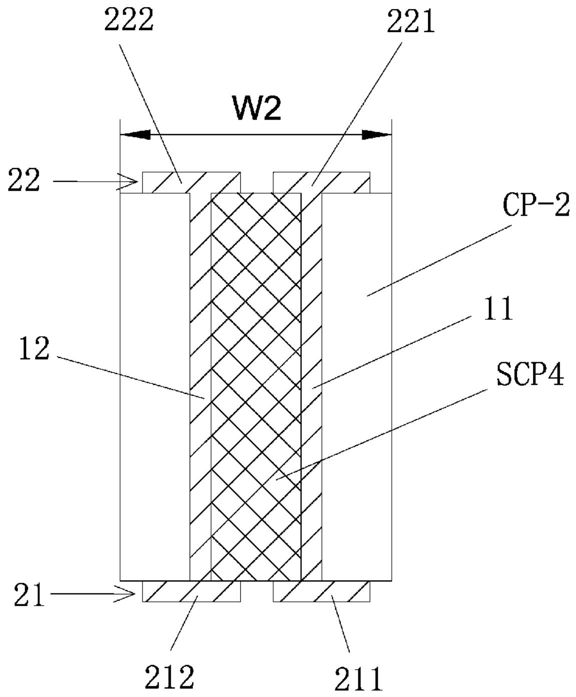
FIG. 6C illustrates a structural diagram showing an example according to the present disclosure in which the third conductive layer and the fourth conductive layer are electrically connected through a first sub-substrate.

FIG. 6B is a structural diagram showing a comparative example in which the third conductive layer 21 (i.e., the lower horizontal copper foil) and the fourth conductive layer 22 (i.e., the upper horizontal copper foil) are electrically connected via through holes V1 and V2. FIG. 6C is a structural diagram showing an example according to the present disclosure in which the third conductive layer 21 (i.e., the lower horizontal copper foil) and the fourth conductive layer 22 (i.e., the upper horizontal copper foil) are electrically connected via a first sub-substrate SCP4. As can be obviously seen from FIG. 6B, the substrate CP-1 includes the third conductive layer 21 and the fourth conductive layer 22, the third conductive layer 21 includes the first trace portion 211 and the second trace portion 212, and the fourth conductive layer 22 includes the first trace portion 221 and the second trace portion 222. The first trace portion 211 of the third conductive layer 21 and the first trace portion 221 of the fourth conductive layer 22 are connected via the through hole V1. The second trace portion 212 of the third conductive layer 21 and the second trace portion 221 of the fourth conductive layer 22 are connected via the through hole V2. As can be obviously seen from FIG. 6C, the substrate CP-2 further includes a first sub-substrate SCP4. A first end of the first conductive layer 11 of the first sub-substrate SCP4 is directly connected to the first trace portion 211 of the third conductive layer 21 of the substrate CP-2. A second end is directly connected to the first trace portion 221 of the fourth conductive layer 22 of the substrate CP-2. Similarly, a first end of the second conductive layer 12 of the first sub-substrate SCP4 is directly connected to the second trace portion 212 of the third conductive layer 21 of the substrate CP-2. A second end is directly connected to the second trace portion 222 of the fourth conductive layer 22 of the substrate CP-2. Obviously, a width size W1 obtained by using the through holes V1 and V2 is greater than a width size W2 obtained by using the first sub-substrate SCP4. Therefore, when the structural feature of the metal wiring layer of the present invention is applied to a conventional substrate structure, it still can achieve the object of reducing the size of the substrate.

Second Embodiment

Figure 7:
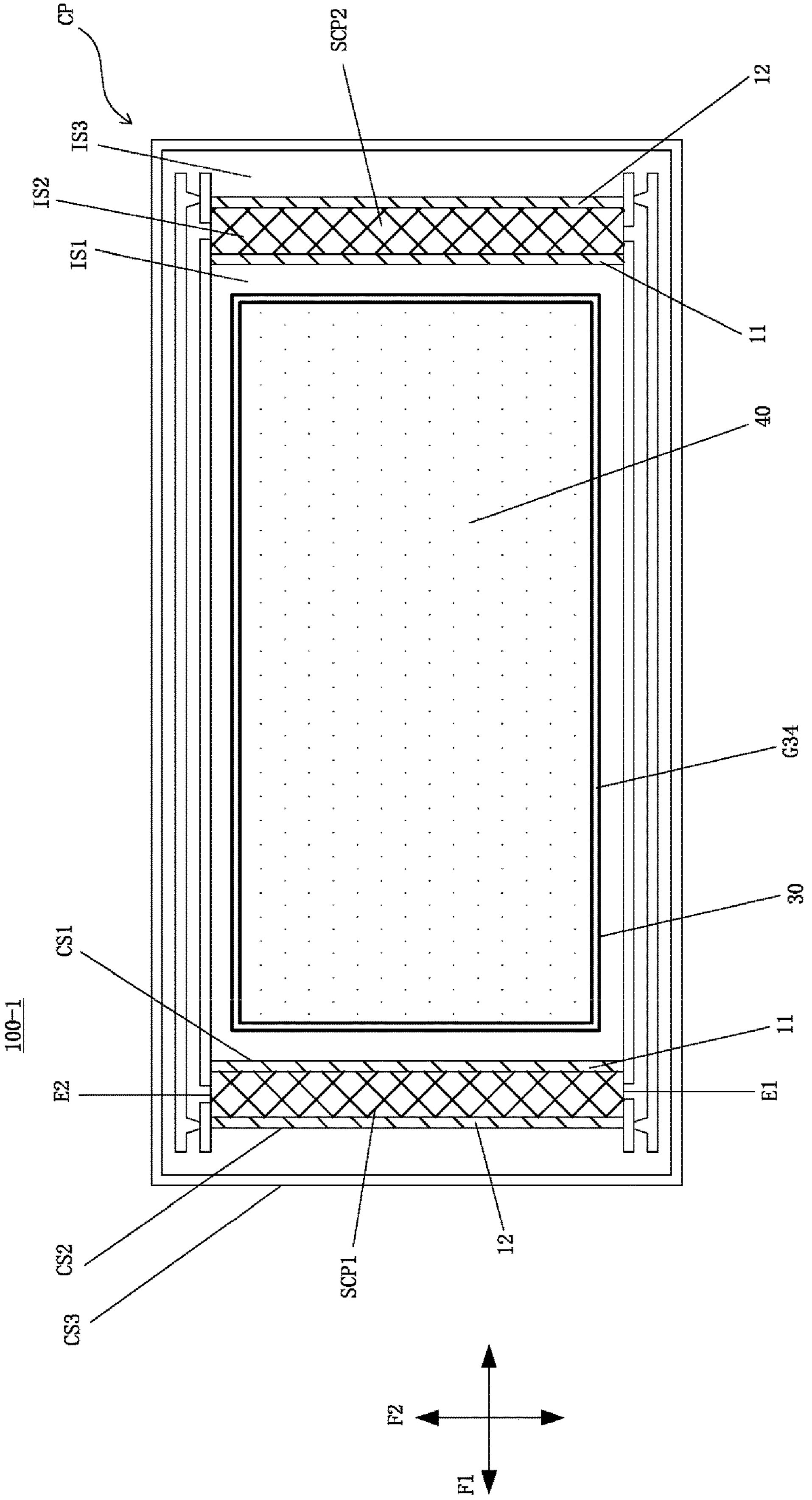
FIG. 7 is a sectional diagram of a magnetic element according to a second embodiment of the present invention taken in a thickness direction, in which a gap is formed between an accommodating space and a magnetic column.

FIG. 7 illustrates a structure of a magnetic element 100-1 according to a second embodiment of the present invention. It differs from the first embodiment in that a gap G34 is provided between the magnetic column 40 and its surrounding insulating layers. That is, a size of the accommodating space 30 formed on the substrate CP is greater than a size of the magnetic column 40. This configuration is mainly based on the fact that the magnetic core is a stress sensitivity material. If the magnetic core is not in direct contact with the substrate, a thermal stress caused by different coefficients of thermal expansion of the material for the substrate and the material for the magnetic core would not be applied onto the magnetic core during the process of thermal expansion and cold contraction. Therefore, the structure of the magnetic element 100-1 in the embodiment may further reduce the stress of the magnetic core, thereby reducing loss of the magnetic core.

Figure 8:
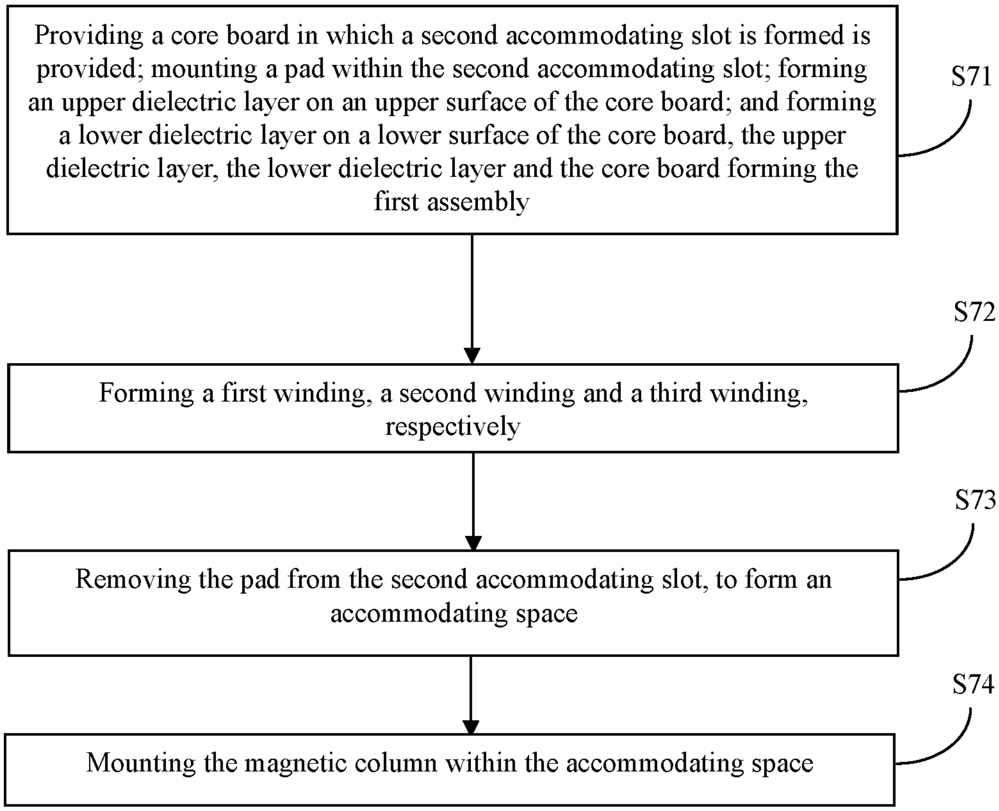
FIG. 8 is a schematic diagram of a process flow for manufacturing the structure of the magnetic element shown in FIG. 7.

With respect to the structure of the magnetic element 100-1 shown in FIG. 7, a process flow for the structure is shown in FIG. 8, including the following steps.

At a step S71, a core board in which a second accommodating slot is formed is provided. A pad is mounted within the second accommodating slot. An upper dielectric layer is formed on an upper surface of the core board. A lower dielectric layer is formed on a lower surface of the core board. The upper dielectric layer, the lower dielectric layer and the core board form the first assembly, the second accommodating slot may be formed by performing, for example, but not limited to, a slot milling process. The first assembly may be formed by performing, for example, but not limited to, a pressing process.

At a step S72, a first winding, a second winding and a third winding are formed, respectively.

At a step S73, the pad is removed from the second accommodating slot, to form an accommodating space.

At a step S74, the magnetic column is mounted within the accommodating space.

Specifically, FIGS. 9A to 9D illustrate respective stages in the process flow shown in FIG. 8.

Figure 9A:
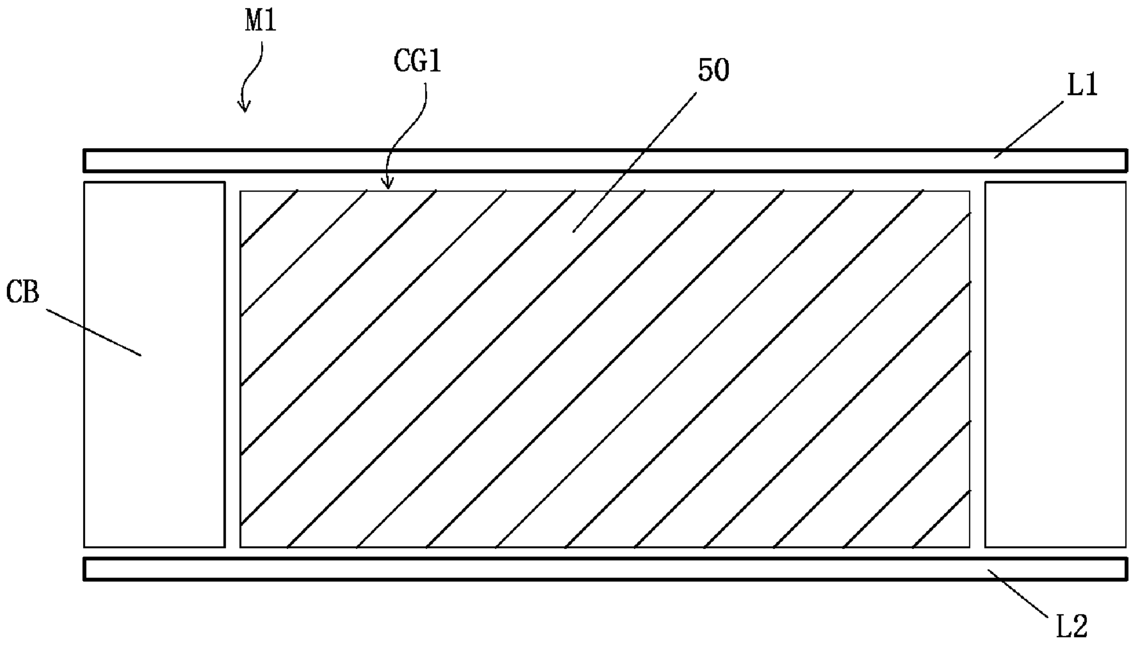
FIGS. 9A to 9D illustrate schematic diagrams of the magnetic element in respective stages in the process flow shown in FIG. 8.

At a stage 1, a pad 50 is embedded into a core board CB, as shown in FIG. 9A.

Firstly, a core board CB is provided. A slot milling process is performed on the core board CB, i.e., to form an accommodating slot CG1 for holding the pad 50. A dielectric layer L1 is formed on an upper surface of the core board CB. A dielectric layer L2 is formed on a lower surface of the core board CB. The pad 50, the dielectric layer L1, the dielectric layer L2 and the core board CB are formed to be an integral body by the pressing-fit process, as shown in FIG. 9A. The integral structure is referred to as a first assembly M1.

Alternatively, the material for the embedded pad 50 is Teflon. A product made from such material has characteristics of acid resistance, alkali resistance, withstanding high temperatures, and resistance to various organic solvents. Therefore, the dielectric layer L1, the dielectric layer L2 and the core board CB are difficult to be dissolved in Teflon, thereby rendering a non-stick property which facilitates removing the pad 50 from the third assembly in a subsequent process.

Figure 9B:
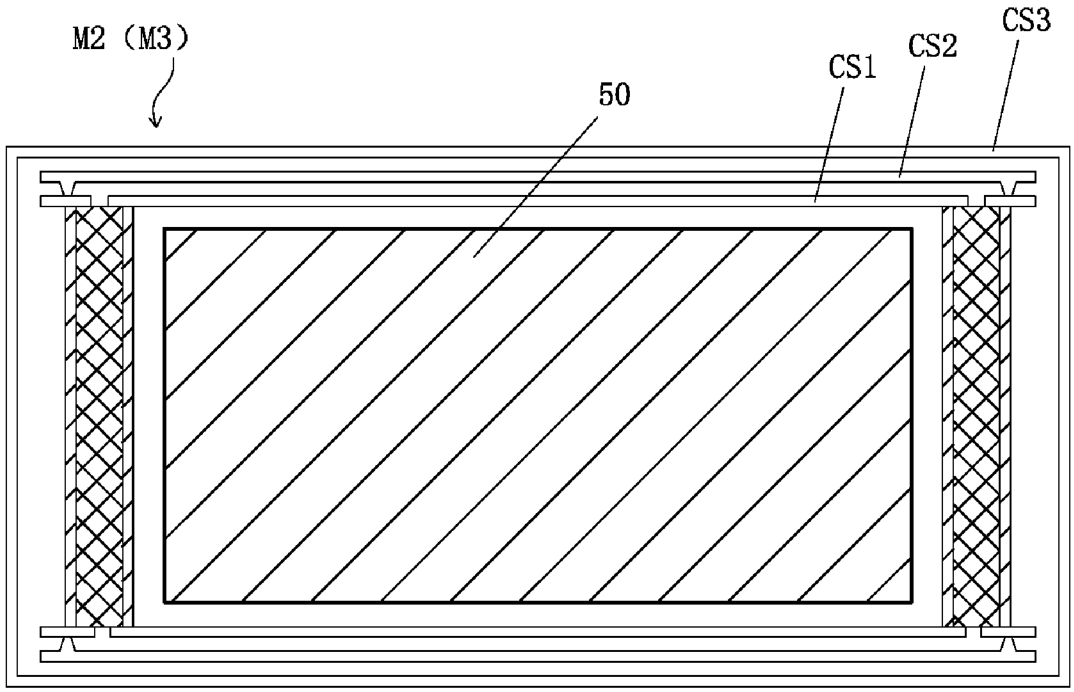

At a stage 2, a first winding CS1, a second winding CS2 and a third winding CS3 are formed, as shown in FIG. 9B.

The processes for forming those windings CS1 to CS3 may refer to those in the first embodiment, as shown in FIGS. 5B to 5F.

Figure 9C:
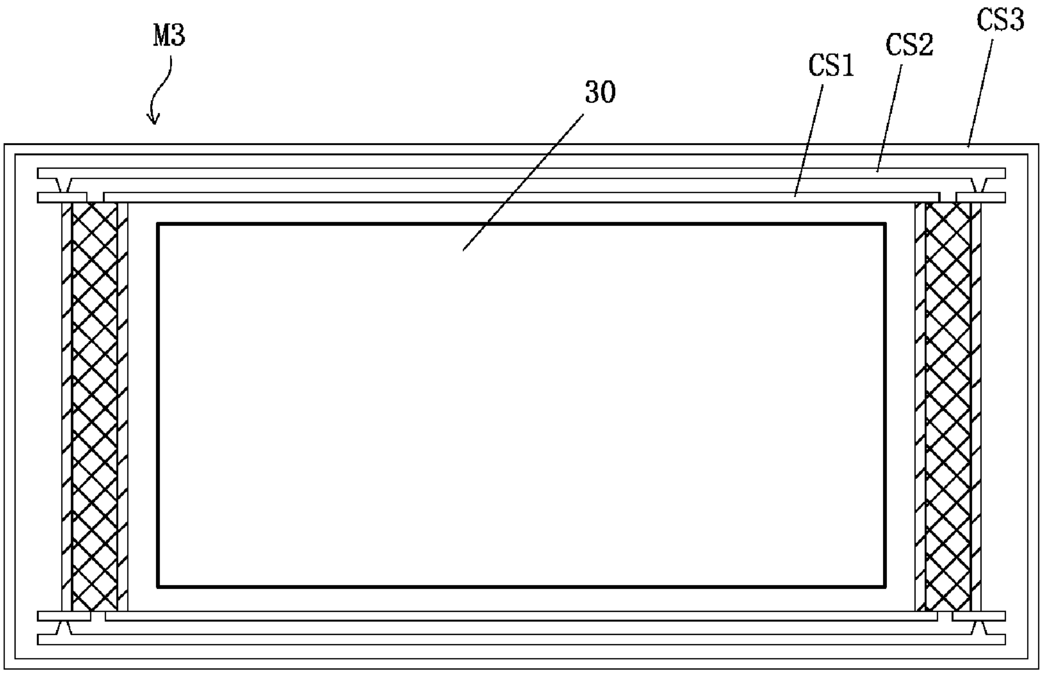

At a stage 3, an accommodating space 30 is formed, as shown in FIG. 9C.

The embedded pad 50 is removed from the third assembly M3, to form the accommodating space 30 for holding the magnetic column 40. In this case, the structure shown in FIG. 9C is a substrate structure.

Figure 9D:
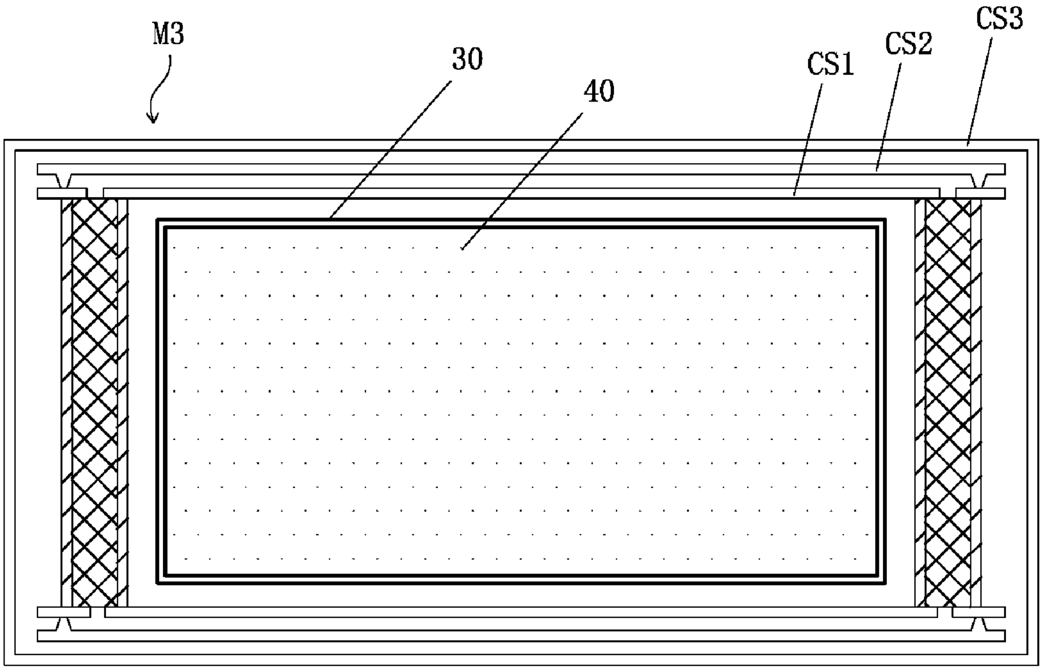

At a stage 4, the magnetic column 40 is mounted into the accommodating space 30 of the substrate structure, to form the magnetic element 100-1 in the embodiment, as shown in FIG. 9D.

Still further, a size of the pad 50 may be slightly greater than a size of the magnetic column 40. For example, with a sectional size a*b of the magnetic column 40, the size of the pad 50 may be (a+0.1 mm)*(b+0.1 mm). In this way, after the pad 50 is removed at the stage 3, the size of the accommodating space 30 may follow the size of the pad 50. A width and a height of the magnetic column 40 are less than a width and a height of the accommodating space 30, respectively. That is, a gap G34 exists between the magnetic column 40 and its surrounding insulating layer (referring to FIG. 7). In this way, during the service, a stress on the magnetic column will not be increased between the magnetic column 40 and the substrate CP due to a difference of coefficients of thermal expansion, thereby reducing the loss of the magnetic core.

Third Embodiment

Figure 10:
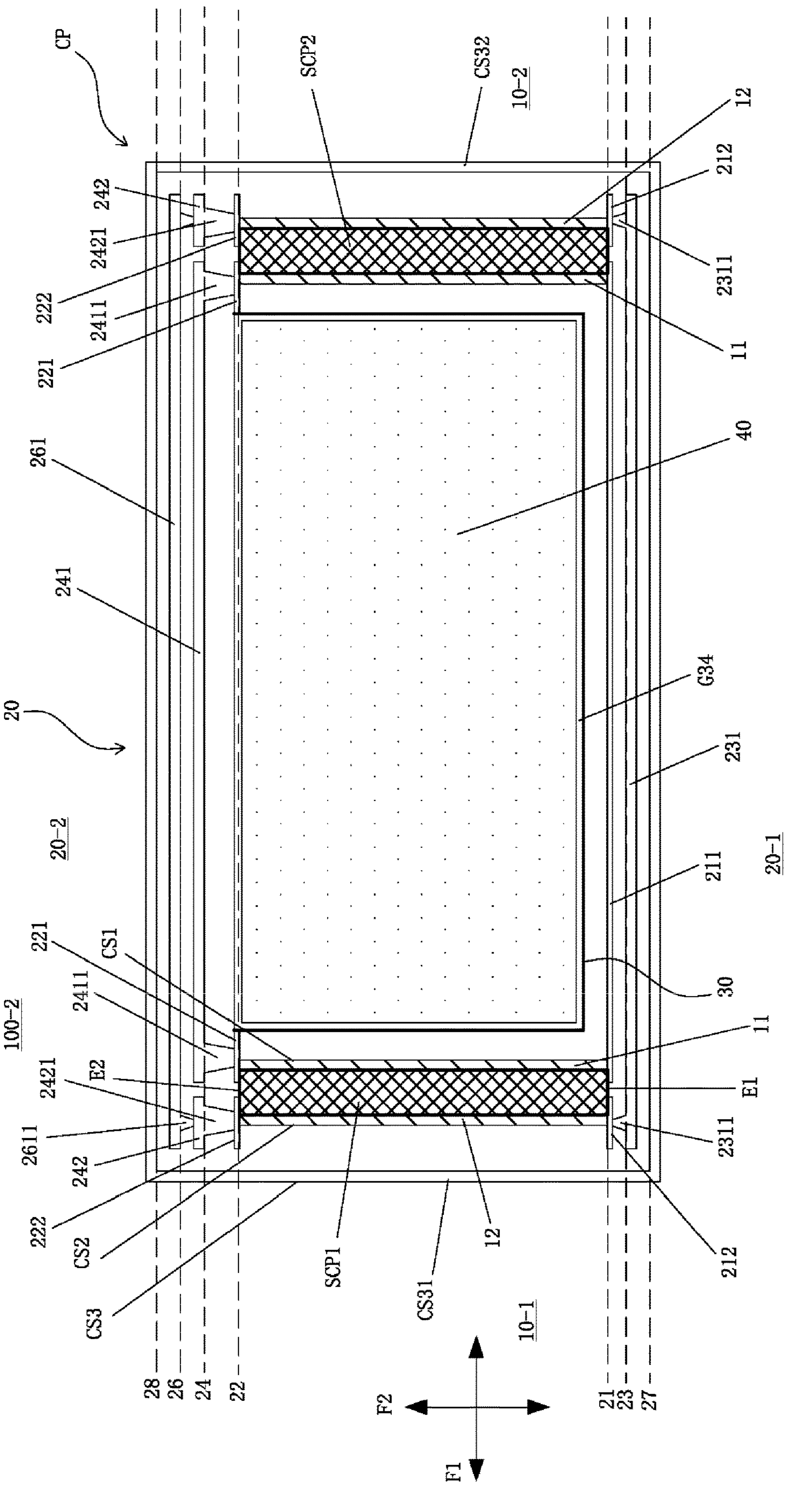
FIG. 10 is a sectional diagram of a magnetic element according to a third embodiment of the present invention taken in a thickness direction, in which a first trace portion of the fifth conductive layer is connected to the first conductive layer through a blind via.

FIG. 10 illustrates a structure of a magnetic element 100-2 according to a third embodiment of the present invention. In the embodiment shown in FIG. 10, the second wiring region 20 of the magnetic element 100-2 includes at least one fifth conductive layer which is disposed on one side of the fourth conductive layer 22 away from the third conductive layer 21 of the magnetic element 100-2. For example, the at least one fifth conductive layer includes one inner fifth conductive layer 24 and one outer fifth conductive layer 26. The second wiring region 20 further includes at least one sixth conductive layer which is disposed on one side of the third conductive layer 21 away from the fourth conductive layer 22. For example, the at least one sixth conductive layer includes one inner sixth conductive layer 23 and one outer sixth conductive layer 27. It differs from the previous embodiments in that a first trace portion 241 of the inner fifth conductive layer 24 is disposed on a second end E2 of the first sub-substrates SCP1 and SCP2, and connected to the first trace portion 221 of the fourth conductive layer 22 through a blind via 2411, and the first trace portion 221 of the fourth conductive layer 22 is in direct contact with and connected to the first conductive layer 11 on the first sub-substrates SCP1 and SCP2. The first trace portion 241 of the inner fifth conductive layer 24, the blind via 2411, the first trace portion 221 of the fourth conductive layer 22, the first conductive layer 11 on the first sub-substrates SCP1 and SCP2, and the first trace portion 211 of the third conductive layer 21 are connected to form a first winding CS1 of the magnetic element 100-2, i.e., a first-turn metal layer close to the magnetic column 40.

In the embodiment shown in FIG. 10, the inner fifth conductive layer 24 further includes two second trace portions 242 which are arranged close to two ends of the first trace portion 241 of the inner fifth conductive layer 24, respectively, and separated from the first trace portion 241 of the inner fifth conductive layer 24. A first trace portion 261 of the outer fifth conductive layer 26 is connected to the second trace portions 242 of the inner fifth conductive layer 24 through a blind via 2611. The second trace portion 242 of the inner fifth conductive layer 24 is connected to second trace portion 222 of the fourth conductive layer 22 through a blind via 2421. The second trace portions 222 of the fourth conductive layer 22 are respectively in direct contact with and connected to a second conductive layers 12 on the first sub-substrates SCP1 and SCP2, to form a part of the windings of the magnetic element 100-2, for example, forming a part of the second winding CS2.

In the embodiment shown in FIG. 10, a first trace portion 231 of the inner sixth conductive layer 23 is disposed on a first end E1 of the first sub-substrates SCP1 and SCP2, and connected to a second trace portion 212 of the third conductive layer 21 through a blind via 2311. The second trace portions 212 of the third conductive layer 21 are respectively in direct contact with and connected to the second conductive layers 12 on the first sub-substrates SCP1 and SCP2, to form a part of the windings of the magnetic element 100-2, for example, forming a part of the second winding CS2. The first trace portion 261 of the outer fifth conductive layer 26, the blind via 2611, the second trace portion 242 of the inner fifth conductive layer 24, the blind via 2421, the second trace portions 222 of the fourth conductive layer 22, the second conductive layer 12 on the first sub-substrates SCP1 and SCP2, the second trace portion 212 of the third conductive layer 21, the blind via 2311 and the first trace portion 231 of the inner sixth conductive layer 23 are connected to form the second winding CS2 of the magnetic element 100-2, i.e., a second-turn metal layer in the middle.

In the embodiment shown in FIG. 10, a third winding CS3 on the outermost side of the magnetic element 100-2 is manufactured by a board edge metallization process. The third winding CS3 includes another one outer fifth conductive layer 28, one outer sixth conductive layer 27, a first vertical copper foil CS31 and a second vertical copper foil CS32 that are connected together.

Since a size of the blind vias 2411, 2421, 2311, 2611 in the embodiment is obviously less than a size of the through holes in the structure of the related art, a width of the magnetic element obtained is reduced accordingly. As compared to the first embodiment, the gap G34 is provided between the magnetic column 40 and its surrounding insulating layer in the embodiment, which reduces a stress of the magnetic core, thereby reducing loss of the magnetic core.

Figure 11:
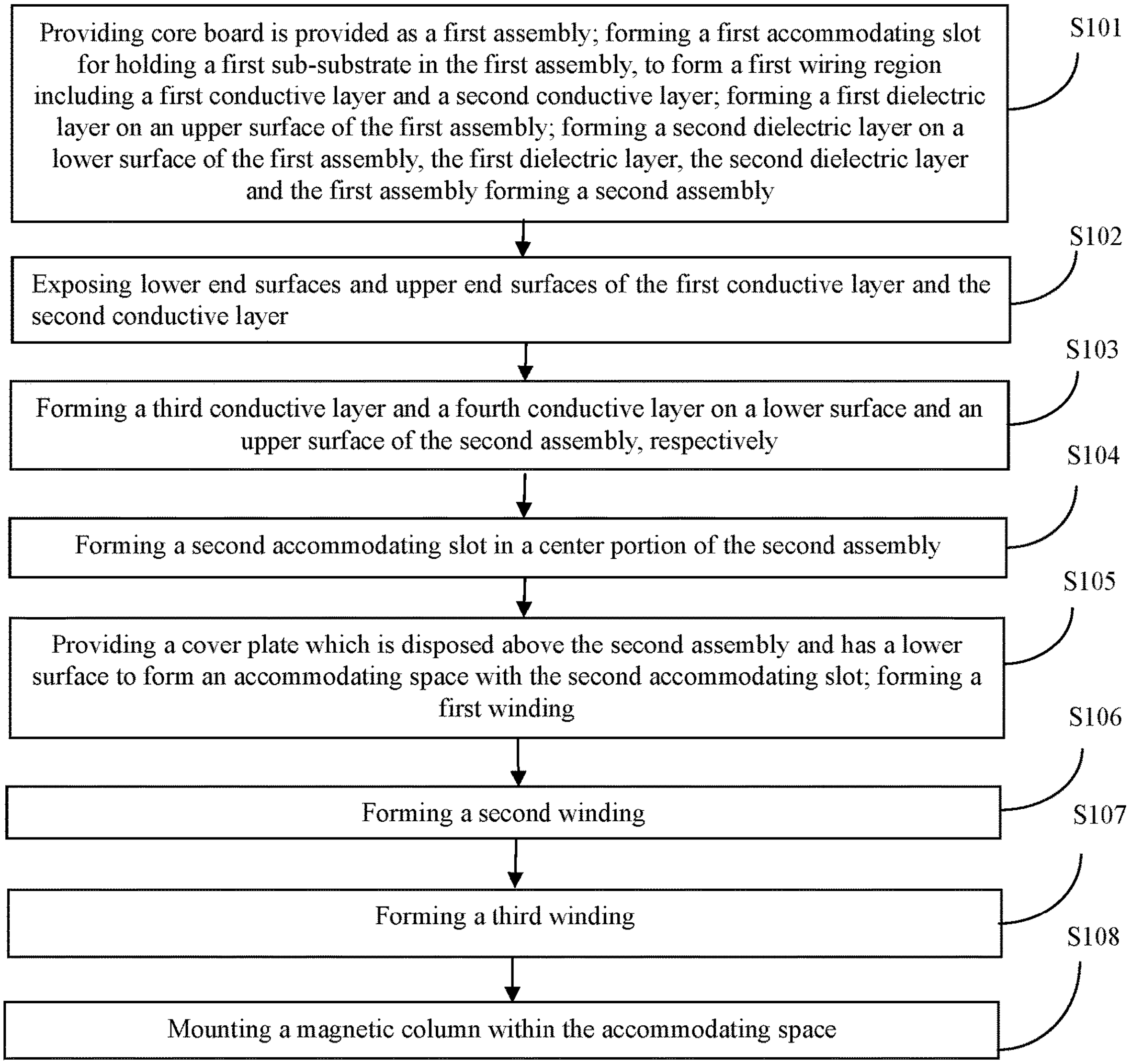
FIG. 11 is a schematic diagram of a process flow for manufacturing a structure of the magnetic element shown in FIG. 10.

With respect to the structure of the magnetic element 100-2 shown in FIG. 10, a process flow for the structure is shown in FIG. 11, including the following steps.

At a step S101, a core board is provided as a first assembly. A first accommodating slot for holding a first sub-substrate is formed in the first assembly, to form a first wiring region including a first conductive layer and a second conductive layer. A first dielectric layer is formed on an upper surface of the first assembly. A second dielectric layer is formed on a lower surface of the first assembly. The first dielectric layer, the second dielectric layer and the first assembly form a second assembly. The first accommodating slot may be formed by performing, for example, but not limited to, a slot milling process. The second assembly may be formed by performing, for example, but not limited to, a pressing process.

At a step S102, lower end surfaces and upper end surfaces of the first conductive layer and the second conductive layer are exposed by performing, for example, but not limited to, a method of scrubbing process on a lower surface and an upper surface of the second assembly.

At a step S103, a third conductive layer and a fourth conductive layer are formed on a lower surface and an upper surface of the second assembly, respectively, by performing, for example, but not limited to, a method of metalizing process.

At a step S104, a second accommodating slot is formed in a center portion of the second assembly. The second accommodating slot may be formed by performing, for example, but not limited to, a slot milling process.

At a step S105, a cover plate is provided. The cover plate is disposed above the second assembly and has a lower surface to form an accommodating space with the second accommodating slot. A first winding is formed by a process flow including but not limited to a drilling process, a metalizing process, an etching process or the like.

At a step S106, a second winding is formed.

At a step S107, a third winding is formed.

At a step S108, a magnetic column is formed within the accommodating space.

Specifically, FIGS. 12A to 12H illustrate respective stages in the process flow shown in FIG. 11.

Figure 12A:
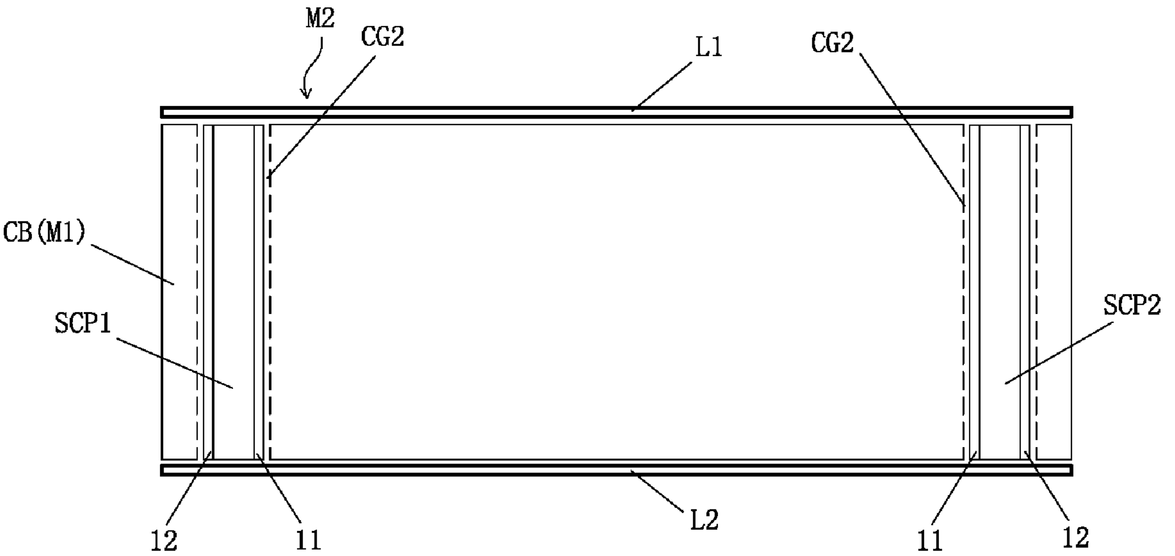
FIGS. 12A to 12H illustrate schematic diagrams of the magnetic element in respective stages in the process flow shown in FIG. 11.

At a stage 1, first sub-substrates SCP1 and SCP2 are embedded into a core board CB, as shown in FIG. 12A.

Firstly, a core board CB is provided as a first assembly M1. A slot milling process is performed on the core board CB. That is, a first accommodating slot CG2 is formed for holding the first sub-substrates SCP1 and SCP2. A dielectric layer L1 is formed on the upper surface of the first assembly M1. A dielectric layer L2 is formed on the lower surface of the first assembly M1. The first sub-substrates SCP1 and SCP2, the dielectric layer L1, the dielectric layer L2 and the core board CB form an integral body by a pressing-fit process, as shown in FIG. 12A. Except for the first sub-substrates SCP1 and SCP2, remaining portions, i.e. the dielectric layer L1, the dielectric layer L2 and the core board CB as a whole are referred to as a second assembly M2.

Figure 12B:
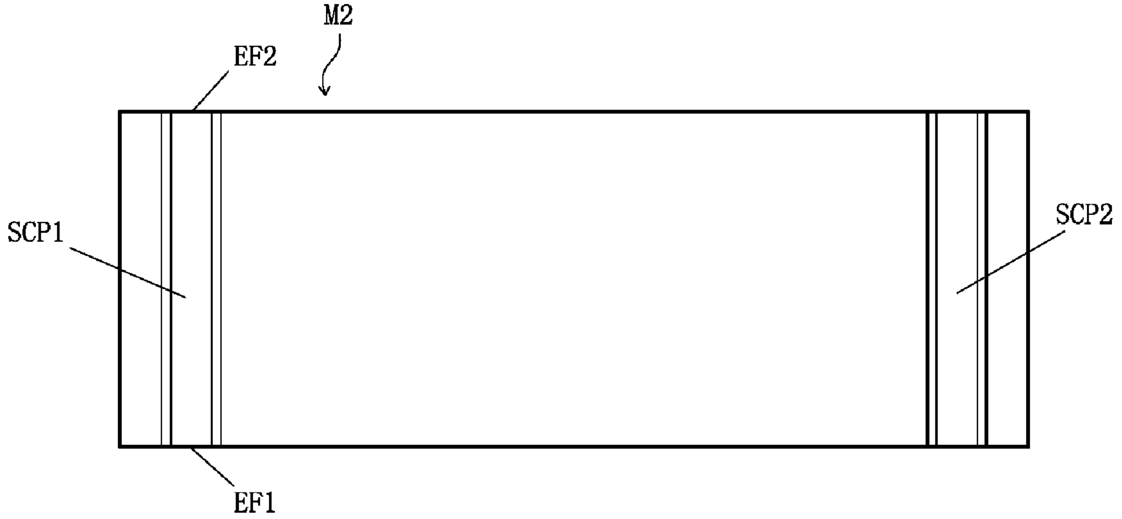
Figure 12C:
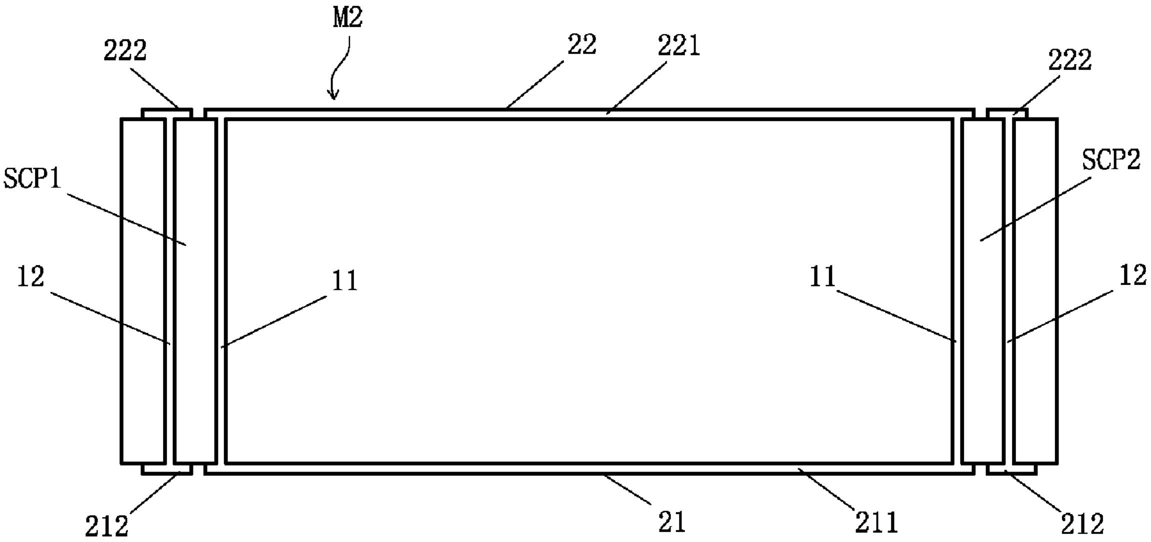

At a stage 2, a metal wiring layer is formed on the second assembly M2, as shown in FIGS. 12B to 12C.

Specifically, a first end surface EF1 and a second end surface EF2 of each of the first sub-substrates SCP1 and SCP2 are exposed by performing a scrubbing process on the second assembly M2. Horizontal copper foils are formed on the exposed first and second end surfaces EF1 and EF2 by a metalizing process, i.e., forming a third conductive layer 21 and a fourth conductive layer 22. The horizontal copper foils corresponding to the first trace portion 211 and the second trace portion 212 of the third conductive layer 21 which are split by an etching process, such that one of two ends of the first trace portion 211 of the third conductive layer 21 is in direct contact with and connected to the first conductive layer 11 on the first sub-substrate SCP1, the other one of two ends of the first trace portion 211 of the third conductive layer 21 is in direct contact with and connected to one of the first conductive layer 11 on the first sub-substrate SCP2. The horizontal copper foils corresponding to the first trace portion 221 and the second trace portions 222 on the fourth conductive layer 22 are split, such that one of two ends of the first trace portion 221 of the fourth conductive layer 22 is in direct contact with and connected to the first conductive layer 11 on the first sub-substrate SCP1, the other one of two ends of the first trace portion 221 of the fourth conductive layer 22 is in direct contact with and connected to the first conductive layer 11 on the first sub-substrate SCP2, and that one of two second trace portions 222 of the fourth conductive layer 22 is in direct contact with and connected to one of the second conductive layer 12 on the first sub-substrate SCP1, the other one of two second trace portions 222 of the fourth conductive layer 22 is in direct contact with and connected to one of the second conductive layer 12 on the first sub-substrate SCP2, as shown in FIG. 12C.

Figure 12D:
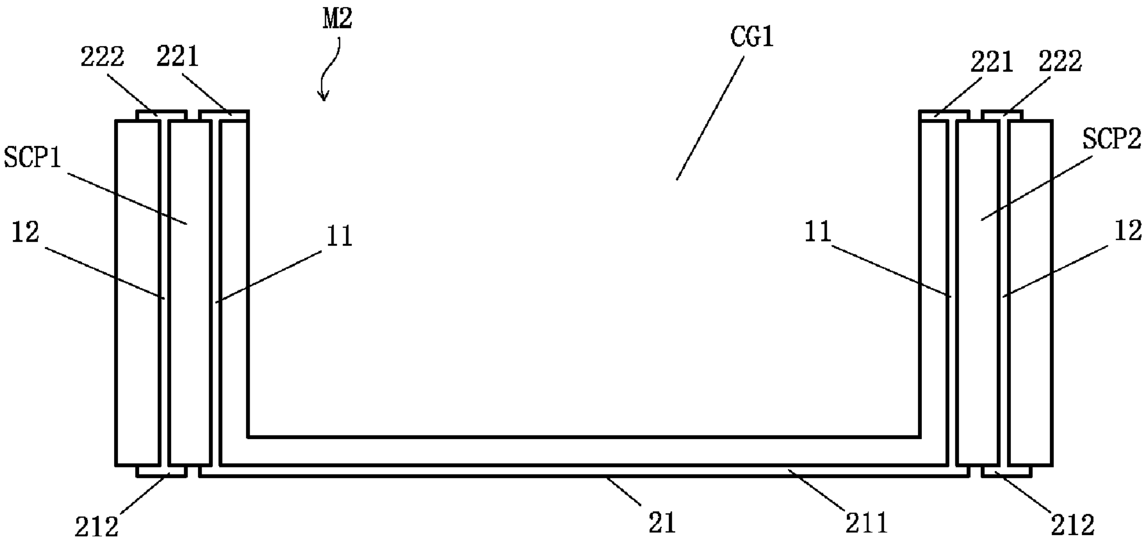
Figure 12E:
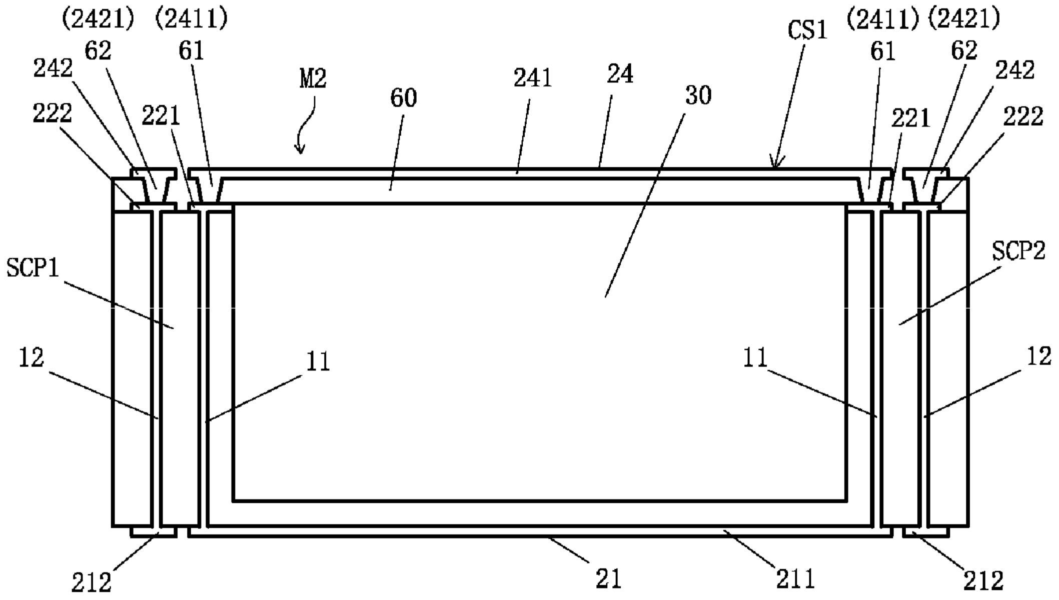

At a stage 3, an accommodating space 30 is formed, as shown in FIGS. 12D to 12E.

A slot milling process is performed on a middle portion of the second assembly M2, i.e., to mill a slot, to form the second accommodating slot CG1, as shown in FIG. 12D. A cover plate 60 is disposed above the second assembly M2, i.e., above the slot, as shown in FIG. 12E. The cover plate 60 and the second assembly M2 may be adhered through an insulating material (not shown), to form an integral body. The cover plate 60 has a lower surface to form the accommodating space 30 with the second accommodating slot CG1. The accommodating space 30 is provided for holding the magnetic column 40. On this basis, a first blind via 61, corresponding to the blind via 2411 in FIG. 10, and a second blind via 62, corresponding to the blind via 2421 in FIG. 10, are formed in the cover plate 60 through a laser drilling process. The inner fifth conductive layer 24 is formed on an upper surface of the cover plate 60 through a metalizing process, and split through an etching process such that the inner fifth conductive layer 24 include one first trace portion 241 and two second trace portion 242, as shown in FIG. 12E. Each end of the first trace portion 241 of the inner fifth conductive layer 24 is connected to one first trace portion 221 of the fourth conductive layer 22 through the first blind via 61, respectively. Each of the second trace portions 242 of the inner fifth conductive layer 24 is connected to one of the second trace portions 222 of the fourth conductive layer 22 through the second blind via 62, respectively. The first trace portion 241 of the inner fifth conductive layer 24, the first blind via 61, the two first trace portions 221 of the fourth conductive layer 22, the first conductive layer 11 on the first sub-substrates SCP1 and SCP2, and the first trace portion 211 of the third conductive layer 21 are connected to form a first winding CS1 of the magnetic element 100-2.

Figure 12F:
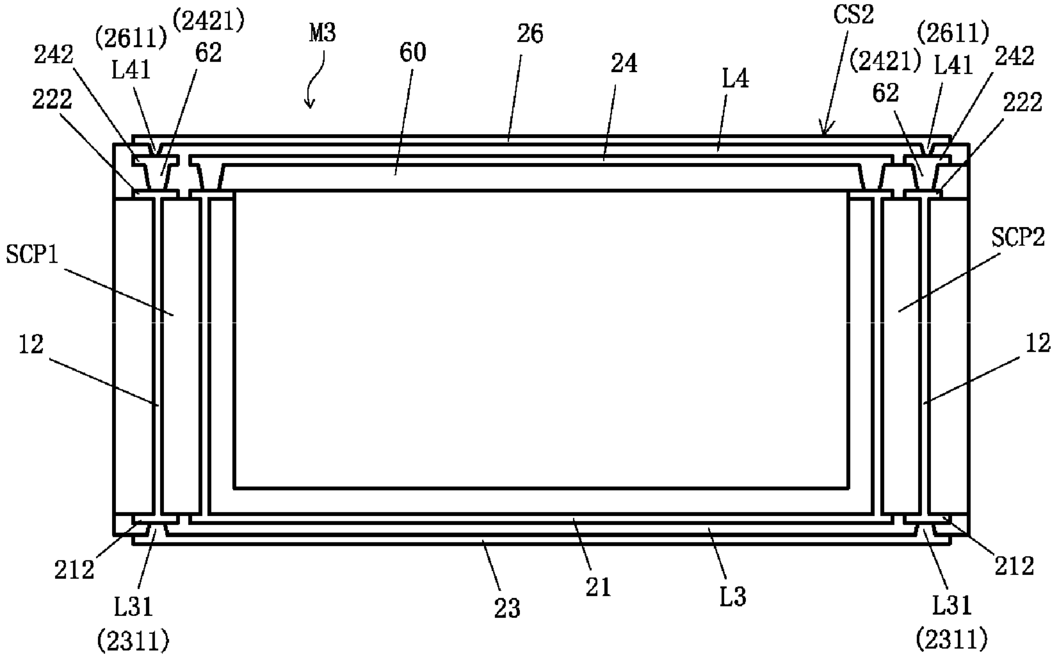
Figure 12G:
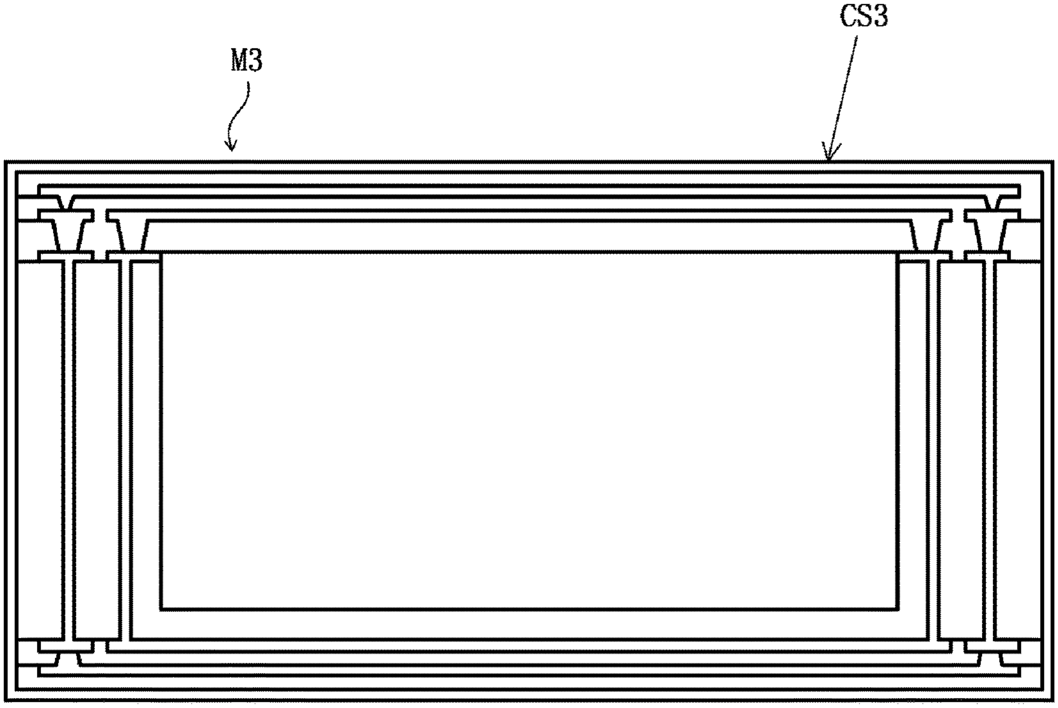

At a stage 4, a second winding CS2 and a third winding CS3 are formed, as shown in FIGS. 12F to 12G.

A dielectric layer L3 is formed on a lower surface of the third conductive layer 21. A dielectric layer L4 is formed on an upper surface of the inner fifth conductive layer 24. The dielectric layer L3, the dielectric layer L4, the cover plate 60 and the second assembly M2 form an integral body through a pressing-fit process, which is defined as a third assembly M3, as shown in FIG. 12F.

Through drilling processes, two third blind vias L31, corresponding to the blind via 2311 in FIG. 10, are formed on the dielectric layer L3, and two fourth blind vias L41, corresponding to the blind via 2611 in FIG. 10, are formed on the dielectric layer L4. Each of the third blind vias L31 is correspondingly connected to one of the second trace portions 212 of the third conductive layer 21. Each of the fourth blind vias L41 is correspondingly connected to one of the second trace portions 242 of the inner fifth conductive layer 24.

Through metalizing processes, the inner sixth conductive layer 23 is formed on a lower surface of the dielectric layer L3, and the outer fifth conductive layer 26 is formed on an upper surface of the dielectric layer L4. Each end of the inner sixth conductive layer 23 is correspondingly connected to one of the second trace portions 212 of the third conductive layer 21 through one of the third blind vias L31. Each end of the outer fifth conductive layer 26 is correspondingly connected to one of the second trace portions 242 of the inner fifth conductive layer 24 through one of the fourth blind vias L41. The inner sixth conductive layer 23, the third blind vias L31, the two second trace portions 212 of the third conductive layer 21, the second conductive layers 12 on the first sub-substrates SCP1 and SCP2, the two second trace portions 222 of the fourth conductive layer 22, the second blind vias 62, the two second trace portions 242 of the inner fifth conductive layer 24, the fourth blind vias L41 and the outer fifth conductive layer 26 are connected to form a second winding CS2 of the magnetic element 100-2, as shown in FIG. 12F.

After dielectric layers are formed on an upper surface of the outer fifth conductive layer 26 and a lower surface of the inner sixth conductive layer 23, a third winding CS3 of the magnetic element 100-2 is formed by performing, for example, but not limited to, a board edge metallization process, as shown in FIG. 12G.

Figure 12H:
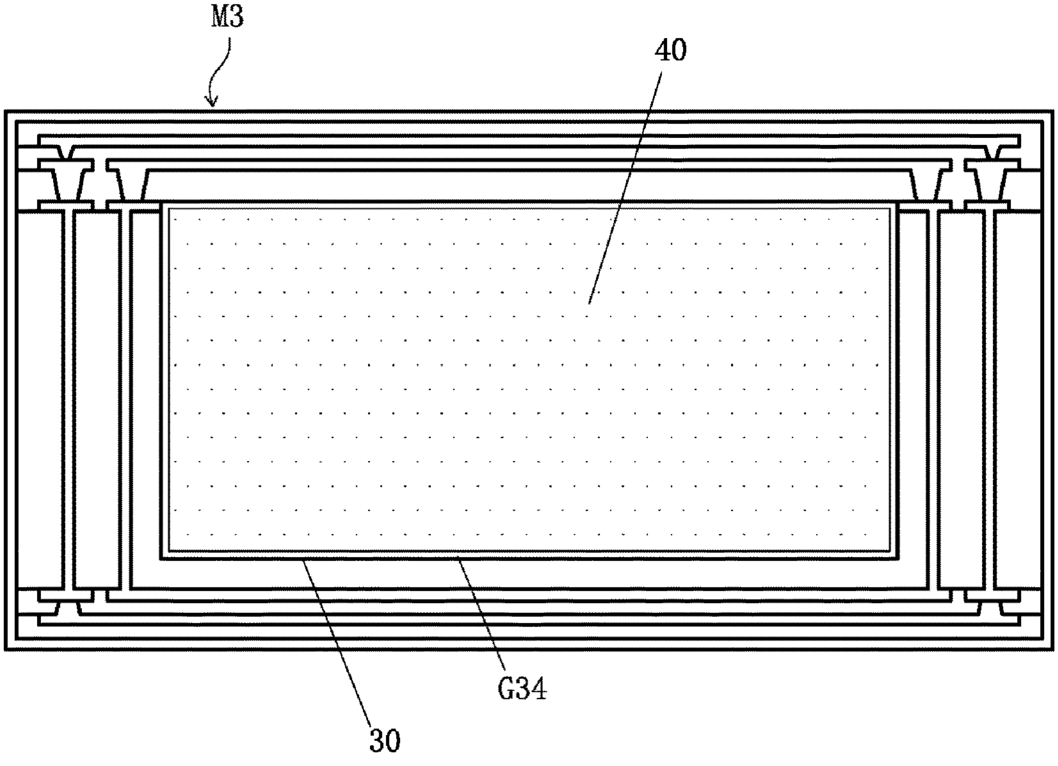

At a stage 5, the magnetic column 40 is mounted into the accommodating space 30 of the third assembly M3, to form the magnetic element 100-2 in the embodiment, as shown in FIG. 12H.

By comparing the processes in the second and third embodiments, it can be obviously seen that the pad 50 is omitted in the third embodiment, which simplifies the process flow and reduces the cost.

Figure 13:
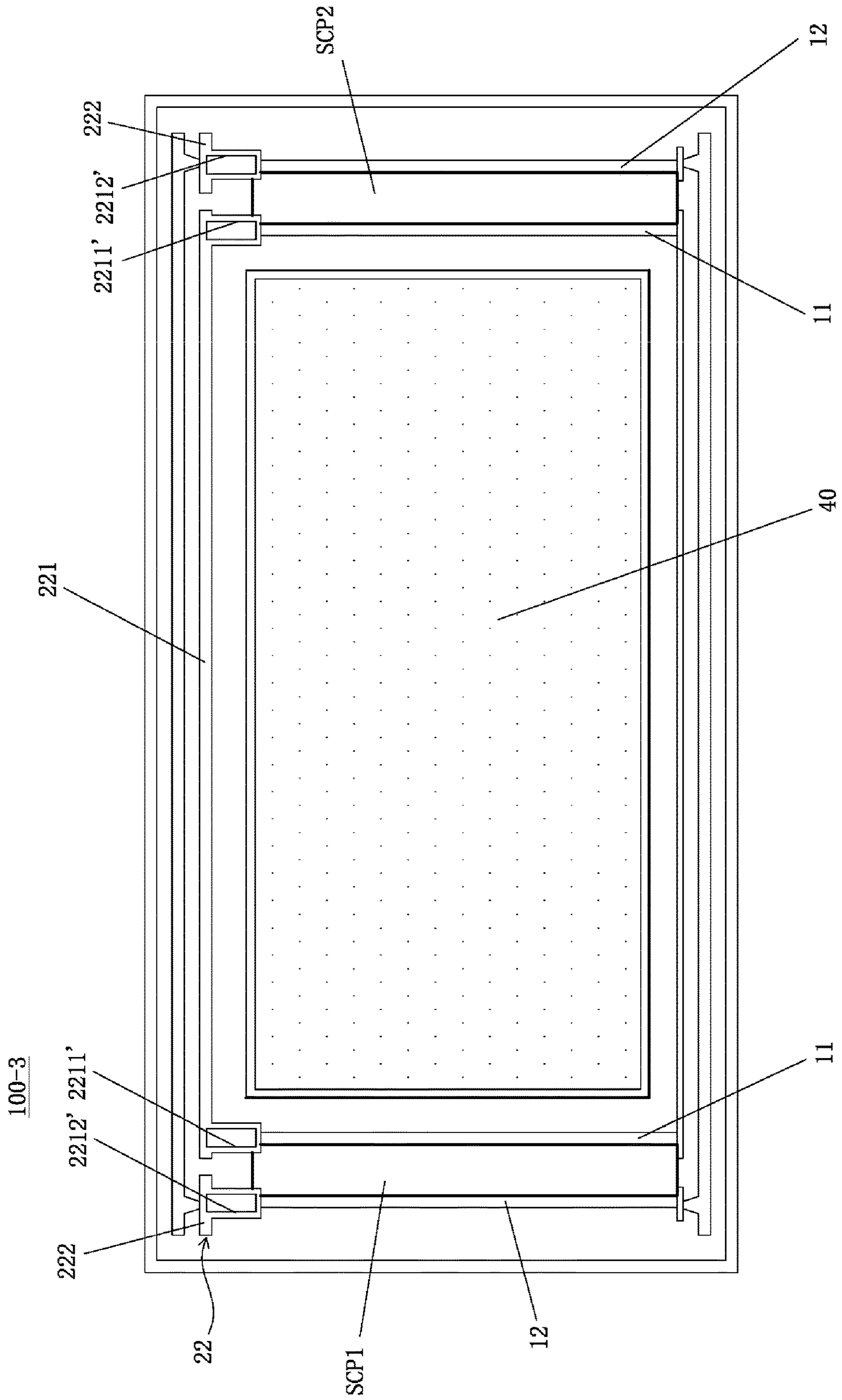
FIG. 13 is a modified structure of the magnetic element shown in FIG. 10, in which a first trace portion of the fifth conductive layer of the magnetic element is directly connected to the first conductive layer through a mechanical blind via, and a second trace portion of the fourth conductive layer is directly connected to the second conductive layer through a mechanical blind via.

FIG. 13 illustrates a modification of the magnetic element shown in FIG. 10. In the embodiment, the first trace portion 221 of the fourth conductive layer 22 of the magnetic element 100-3 is directly connected to the first conductive layers 11 on the first sub-substrates SCP1 and SCP2 through mechanical blind vias 2211'. The second trace portions 222 of the fourth conductive layer 22 are directly connected to the second conductive layers 12 on the first sub-substrates SCP1 and SCP2 through mechanical blind vias 2212'. Since the first trace portion 221 of the fourth conductive layer 22 may be directly connected to the first conductive layers 11 through the mechanical blind vias in the structure shown in FIG. 13, the scrubbing process performed on the upper end surfaces EF2 of the first sub-substrates SCP1 and SCP2 shown in FIG. 12B and the metalizing operation performed on the upper end surfaces EF2 of the first sub-substrates SCP1 and SCP2 shown in FIG. 12C may be omitted for the magnetic element 100-3 as compared with the process flows shown in FIGS. 12A to 12H.

Alternatively, on a basis of FIG. 10, the structure of mechanical blind vias may only be provided at a certain corner position of the magnetic column 40, and a structure of laser blind vias may be provided at remaining positions. The mechanical blind vias and the laser blind vias are used for the connection of the conductive layers.

Alternatively, the magnetic element 100-3 may only include one first sub-substrate. For example, in FIG. 13, the magnetic element 100-3 may only include a first sub-substrate SCP1 disposed on the left side of the magnetic column 40. A connection on a right side of the magnetic column 40 may be implemented with a connection having a structure of through holes in the related art, which may still achieve the object of reducing the size of the magnetic element.

Fourth Embodiment

Figure 14:
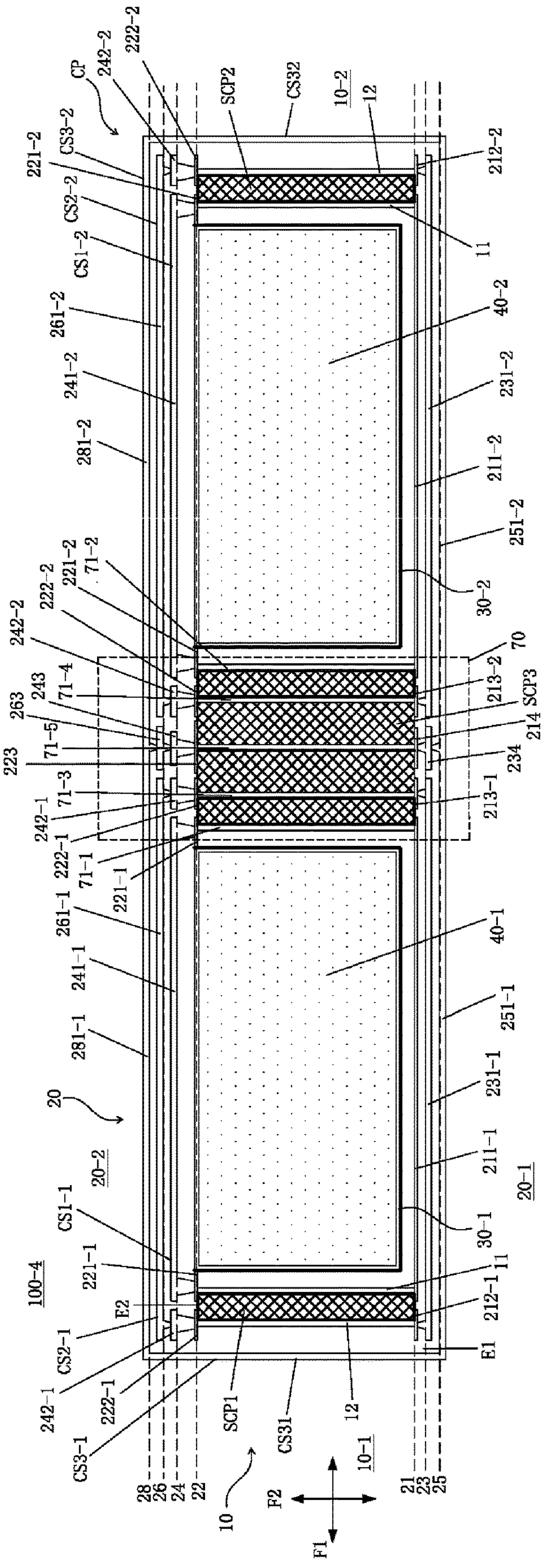
FIG. 14 is a sectional diagram of a magnetic element according to a fourth embodiment of the present invention taken in a thickness direction, in which the magnetic element further includes a third wiring region, and further conductive layers are provided between two ninth conductive layers of the third wiring region.

FIG. 14 illustrates a structure of a magnetic element 100-4 according to a fourth embodiment of the present invention. It differs from the previous embodiments in that the magnetic element 100-4 includes two first wiring regions 10-1 and 10-2, one second wiring region 20, two accommodating spaces 30-1 and 30-2 disposed separately, two magnetic columns 40-1 and 40-2, and one third wiring region 70. Each of the two accommodating spaces 30-1 and 30-2 is disposed between the two first wiring regions 10-1 and 10-2, with the third wiring region 70 interposed between the two accommodating spaces 30-1 and 30-2. The magnetic columns 40-1 is disposed within the accommodating space 30-1, The magnetic columns 40-2 is disposed within the accommodating space 30-2. Moreover, the winding of the magnetic element 100-4 includes a plurality of layers of sub-windings with at least three layers of the sub-windings wound sequentially around each of the magnetic columns 40-1/40-2 from inside to outside in a circumferential direction, for example, to form first sub-windings CS1-1 and CS1-2 in the innermost layer, second sub-windings CS2-1 and CS2-2 in the middle layer, and third sub-windings CS3-1 and CS3-2 in the outermost layer.

The third wiring region 70 includes two ninth conductive layers 71-1 and 71-2 which are arranged along the first direction F1 and are disposed in opposite sides of the third wiring region 70. The third conductive layer 21 includes two first trace portions 211-1 and 211-2, each of which is disposed close to one of the accommodating spaces 30-1 and 30-2, respectively. The first trace portions 211-1 of the third conductive layer 21 is disposed on the lower surface of the accommodating spaces 30-1, and the first trace portions 211-2 of the third conductive layer 21 is disposed on the lower surface of the accommodating spaces 30-2. One first conductive layer 11 and the ninth conductive layers 71-1 are arranged on opposite sides of the magnetic column 40-1, and are respectively in direct contact with and connected to a first end and a second end of the first trace portions 211-1 of the third conductive layer 21, to form a part of the windings of the magnetic element 100-4, for example, forming a part of the first sub winding CS1-1. The other one first conductive layer 11 and the ninth conductive layers 71-2 are arranged on opposite sides of the magnetic column 40-2, and are respectively in direct contact with and connected to a first end and a second end of the first trace portions 211-2 of the third conductive layer 21, to form a part of the windings of the magnetic element 100-4, for example, forming a part of the first sub winding CS1-2. The fourth conductive layer 22 includes two first trace portions 221-1 and 221-2, each of which is disposed close to one of the accommodating spaces 30-1 and 30-2, respectively. The first trace portions 241-1 of the inner fifth conductive layer 24 is disposed on the upper surface of the accommodating spaces 30-1, and the first trace portions 241-2 of the inner fifth conductive layer 24 is disposed on the upper surface of the accommodating spaces 30-2. The first conductive layer 11 and the ninth conductive layers 71-1, which are arranged on opposite sides of the magnetic column 40-1, are in direct contact with and connected to the first trace portions 221-1 of the fourth conductive layer 22, and are respectively connected to a first end and a second end of the first trace portions 241-1 of the inner fifth conductive layer 24 through blind vias, to form a part of the first sub winding CS1-1. The first conductive layer 11 and the ninth conductive layers 71-2, which are arranged on opposite sides of the magnetic column 40-2, are respectively in direct contact with and connected to the first trace portions 221-2 of the fourth conductive layer 22, and are respectively connected to a first end and a second end of the first trace portions 241-2 of the inner fifth conductive layer 24 through blind vias, to form a part of the first sub winding CS1-2.

The third wiring region 70 further includes two tenth conductive layers 71-3 and 71-4 which are disposed separately and are arranged along the first direction F1. The two tenth conductive layers 71-3 and 71-4 are both disposed between the two ninth conductive layers 71-1 and 71-2. The third conductive layer 21 further includes two second trace portions 212-1 and 212-2, the second trace portions 212-1 is separated from the first end of the first trace portion 211-1 of the third conductive layer 21, the second trace portions 212-2 is separated from the first end of the first trace portion 211-2 of the third conductive layer 21. The first trace portion 231-1 of the inner sixth conductive layer 23 is arranged on the lower surface of the accommodating space 30-1, the first trace portion 231-2 of the inner sixth conductive layer 23 is arranged on the lower surface of the accommodating space 30-2. The second trace portion 212-1 of the third conductive layer 21 is in direct contact with and connected to the second conductive layer 12, and connected to a first end of the first trace portion 231-1 of the inner sixth conductive layer 23 through a blind via, to form a part of the second sub-winding CS2-1. The second trace portion 212-2 of the third conductive layer 21 is in direct contact with and connected to the second conductive layer 12, and connected to a first end of the first trace portion 231-2 of the inner sixth conductive layer 23 through a blind via, to form a part of the second sub-winding CS2-2. The third conductive layer further includes two third trace portions 213-1 and 213-2, the third trace portions 213-1 is separated from the second end of the first trace portion 211-1 of the third conductive layer 21, the third trace portions 213-2 is separated from the second end of the first trace portion 211-2 of the third conductive layer 21. The third trace portions 213-1 is in direct contact with and connected to the tenth conductive layer 71-3, to form a part of the second sub-winding CS2-1. The third trace portions 213-2 is in direct contact with and connected to the tenth conductive layer 71-4, to form a part of the second sub-winding CS2-2. The inner fifth conductive layer 24 further includes two second trace portions 242-1 and 242-2, which are provided corresponding to the accommodating spaces 30-1 and 30-2, respectively. The second conductive layer 12 and the tenth conductive layer 71-3, which are arranged on opposite sides of the magnetic column 40-1, are in direct contact with and connected to the second trace portions 222-1 of the fourth conductive layer 22, respectively, and connected to the second trace portions 242-1 of the inner fifth conductive layer 24 through blind vias, and further connected to a first end and a second end of first trace portion 261-1 of the outer fifth conductive layer 26 through blind vias, to form a part of the second sub-winding CS2-1. The second conductive layer 12 and the tenth conductive layer 71-4, which are arranged on opposite sides of the magnetic column 40-2, are in direct contact with and connected to the second trace portions 222-2 of the fourth conductive layer 22, respectively, and connected to the second trace portion regions 242-2 of the inner fifth conductive layer 24 through blind vias, and further connected to a first end and a second end of first trace portions 261-2 of the outer fifth conductive layer 26 through blind vias, to form a part of the second sub-winding CS2-2. The first trace portion 261-1 of the outer fifth conductive layer 26 is arranged on the upper surface of the accommodating space 30-1, the first trace portions 261-2 of the outer fifth conductive layer 26 is arranged on the upper surface of the accommodating space 30-2.

The third wiring region 70 further includes a eleventh conductive layer 71-5. The eleventh conductive layer 71-5 is disposed between the two tenth conductive layers 71-3 and 71-4. The third conductive layer 21 further includes a fourth trace portion 214 which is disposed between the two third trace portions 213-1 and 213-2 of the third conductive layer 21 and separated from the two third trace portions 213-1 and 213. The fourth trace portion 214 of the third conductive layer 21 is in direct contact with and connected to the eleventh conductive layer 71-5. The fourth trace portion 214 of the third conductive layer 21 is further connected to a second trace portion 234 of the inner sixth conductive layer 23 through a blind via, and further connected to the outer sixth conductive layer 25 through a blind via, to form a part of the third sub-winding CS3-1 and a part of the third sub-winding CS3-2. The outer sixth conductive layer 25 includes a first trace portion 251-1 located on the lower side of the magnetic column 40-1 and a first trace portion 251-2 located on the lower side of the magnetic column 40-2. The inner fifth conductive layer 24 further includes a third trace portion 243 which is disposed between the second trace portions 242-1 and 242-2 of the inner fifth conductive layer 24 and separated from the second trace portions 242-1 and 242-2. The third trace portion 243 of the inner fifth conductive layer 24 is connected to a third trace portion 223 of the fourth conductive layer 22 through a blind via. The third trace portion 223 of the fourth conductive layer 22 is in direct contact with and connected to the eleventh conductive layer 71-5. The third trace portion 243 of the inner fifth conductive layer 24 is further connected to a second trace portion 263 of the outer fifth conductive layer 26 through a blind via, and further connected to another outer fifth conductive layer 28 through a blind via, to form a part of the third sub-winding CS3-1 and a part of the third sub-winding CS3-2. The outer fifth conductive layer 28 includes a first trace portion 281-1 located on the upper side of the magnetic column 40-1 and a first trace portion 281-2 located on the upper side of the magnetic column 40-2. The eleventh conductive layer 71-5 is a common winding portion for forming the two third sub-windings CS3-1 and CS3-2 in the outermost layer.

In some embodiments, the third wiring region 70 is formed by a second sub-substrate SCP3. That is, the two ninth conductive layers 71-1 and 71-2, the two tenth conductive layers 71-3 and 71-4, and the eleventh conductive layer 71-5 are disposed on the second sub-substrate SCP3.

In the embodiment, each of the two tenth conductive layers 71-3 and 71-4 of the second sub-substrate SCP3 is connected to a corresponding second trace portion 222-1/222-2 in the fourth conductive layer 22, and connected to a corresponding metal wiring layer of the magnetic element, e.g., including the outer fifth conductive layer 26 and the inner sixth conductive layer 23, through a blind via. The eleventh conductive layer 71-5 of the second sub-substrate SCP3 is connected to the corresponding trace portion 223 in the fourth conductive layer 22, and connected to a corresponding metal wiring layer of the magnetic element, e.g., including the outer fifth conductive layer 26, the second outer fifth conductive layer 28, the inner sixth conductive layer 23 and the outer sixth conductive layer 25, through a blind via.

Like the advantages described above with respect to the previous embodiments, two ninth conductive layers 71-1 and 71-2 of the second sub-substrate are used in place of the conventional structure of through holes, which may efficiently reduce the width of the magnetic element. The two tenth conductive layers 71-3 and 71-4 and the eleventh conductive layer 71-5 are connected through blind vias. According to characteristics of the PCB processes, a width size occupied by the blind vias is less than a width size occupied by the through holes. Accordingly, the width of the magnetic element may still be further reduced.

The two magnetic columns 40-1 and 40-2 in the embodiment may be connected end to end, to form a closed magnetic path.

Fifth Embodiment

Figure 15:
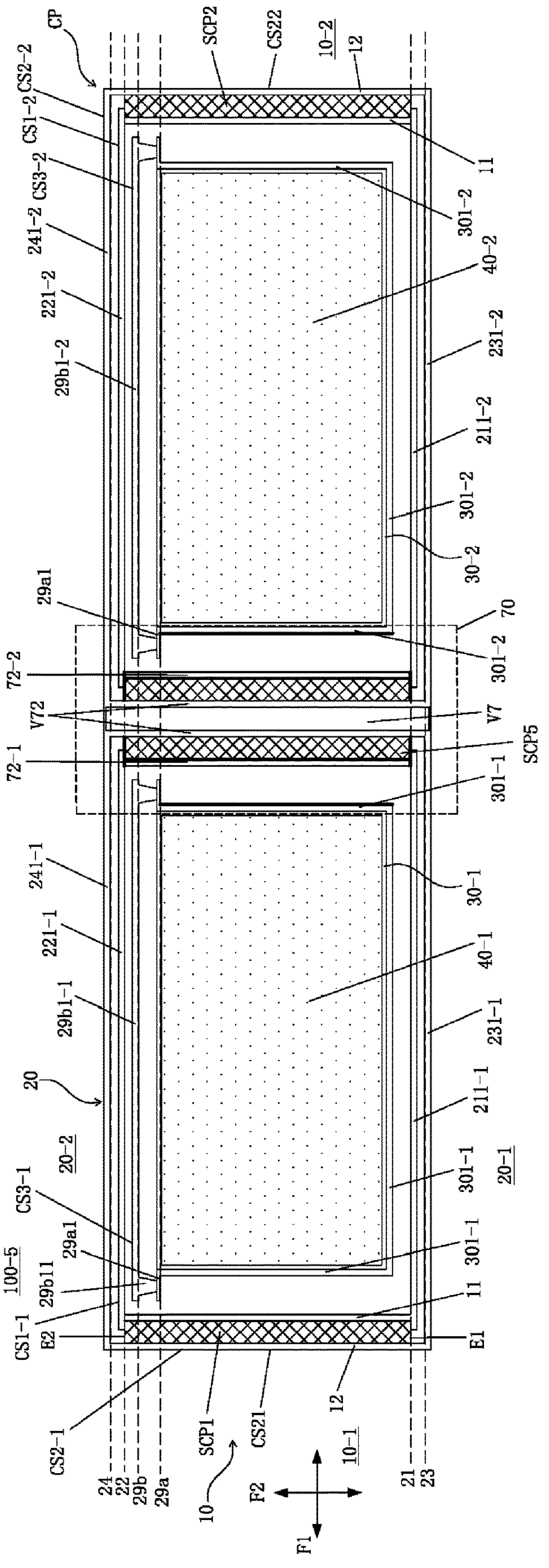
FIG. 15 is a sectional diagram of a magnetic element according to a fifth embodiment of the present invention taken in a thickness direction, in which the magnetic element further includes a third wiring region, and a through hole is provided between the two ninth conductive layers of the third wiring region.

FIG. 15 illustrates a structure of a magnetic element 100-5 according to a fifth embodiment of the present invention. It differs from the previous embodiments in that the windings of the magnetic element 100-5 include a plurality of layers of sub-windings with at least three layers of the sub-windings wound sequentially around each of the magnetic columns 40-1/40-2 from inside to outside in a circumferential direction, for example, forming third sub-windings CS3-1 and CS3-2 in the innermost layer, first sub-windings CS1-1 and CS1-2 in the middle layer, and second sub-windings CS2-1 and CS2-2 in the outermost layer. The magnetic element 100-5 illustrated in the embodiment mainly differs from the magnetic element 100-4 shown in FIG. 14 in the following aspects. In a first aspect, inner walls of the accommodating spaces 30-1 and 30-2 that are close to the two first conductive layer 11, the third conductive layer 21 and the two ninth conductive layers 72-1 and 72-2 are laid with inner wall conductive layers 301-1 and 301-2. The inner wall conductive layers 301-1 and 301-2 are in direct connection to four trace portions 29*a*1 of a seventh conductive layer 29*a*, which are in turn connected to both ends of two first trace portions 29*b*1-1 and 29*b*1-2 of an eighth conductive layer 29*b* through four blind vias 29*b*11, respectively, to form a part of the windings of the magnetic element 100-5, for example, forming the third sub-windings CS3-1 and CS3-2 in the innermost layer. In a second aspect, the ninth conductive layers 72-1 on a second sub-substrate SCP5 between the two magnetic columns 40-1 and 40-2 is in direct contact with and connected to one end of the first trace portions 211-1 of the third conductive layer 21 below the magnetic column 40-1, and one end of the first trace portions 221-1 of the fourth conductive layer 22 above the magnetic column 40-1. Similarly, the ninth conductive layers 72-2 on the second sub-substrate SCP5 is in direct contact with and connected to one end of the first wiring region 211-2 of the third conductive layer 21 below the magnetic column 40-2, and one end of the first wiring region 221-2 of the fourth conductive layer 22 above the magnetic column 40-2. Moreover, the third wiring region 70 further includes a through hole V7 which is disposed on between the two ninth conductive layers 72-1 and 72-2 on the second sub-substrate SCP5. A sidewall conductive layer V72 is provided on a sidewall of the through hole V7, to form a common winding portion of the two second sub-windings CS2-1 and CS2-2 in the outermost layer.

As compared with the embodiment shown in FIG. 14 in which the two tenth conductive layers 71-3 and 71-4 on the second sub-substrate SCP3 between the two magnetic columns 40-1 and 40-2 are connected through blind vias, the fifth embodiment may further reduce the width size of the magnetic element than the fourth embodiment. Here, the third sub-windings CS3-1 and CS3-2 may be arranged on the inner walls of the accommodating spaces 30-1 and 30-2, i.e., including inner wall conductive layers 301-1 and 301-2, and may be connected to corresponding first trace portions 29*b*1-1 and 29*b*1-2 of the corresponding eighth conductive layer 29*b* through blind vias.

Each of the first sub-substrate SCP2 on the right side of the magnetic column 40-2 and the first sub-substrate SCP1 on the left side of the magnetic column 40-1 may be configured to have a structure similar to the second sub-substrate SCP5 during a panel production procedure, and may only divide the second sub-substrate SCP5 in the final board-cutting process, to form the first sub-substrates SCP1 and SCP2 described in the embodiment.

With respect to the magnetic element in the fourth and fifth embodiments, when the magnetic element is manufactured, the magnetic element further includes a second sub-substrate. The number of the first sub-substrates is at least two. The number of the first accommodating slots is at least two. The number of the first wiring regions is at least two. The number of the magnetic columns is at least two. The two magnetic columns are separately disposed between the two first wiring regions, with the second sub-substrate interposed between the two magnetic columns.

Moreover, the step S1 further includes: performing a slot milling process on the first assembly, to form a third accommodating slot for holding the second sub-substrate, to form a third wiring region including two ninth conductive layers which are disposed in two sides of the third wiring region, respectively. Each of the magnetic columns is interposed between one of the ninth conductive layers and one first conductive layer.

The step S3 further includes: performing for example, but not limited to a method of scrubbing process on a lower surface of the second assembly to expose a lower end surface of the ninth conductive layer.

The step S4 further includes: splitting the third conductive layer through an etching process, to form two first trace portions of the third conductive layer. One end of each of the first trace portions of the third conductive layer is in direct contact with and connected to the one first conductive layer, and the other end is in direct contact with and connected to the one of the ninth conductive layers.

The present invention may efficiently increase power density of the power module, i.e., achieving a smaller occupied area, and improve conversion efficiency of the power module, i.e., achieving a lower power loss.

Exemplary embodiments of the present invention are illustrated and described in details. It shall be understood that the present invention is not limited to the disclosed embodiments, and in contrast, the present invention aims to cover various modifications and equivalent arrangements included in spirit and scope of the appended claims.

What is claimed is:

1. A magnetic element, comprising:

a first wiring region comprising a first conductive layer and a second conductive layer which are arranged along a first direction;

a second wiring region comprising a third conductive layer and a fourth conductive layer which are arranged along a second direction perpendicular to the first direction and are disposed in opposite sides of the second wiring region, respectively;

a first sub-substrate configured to form the first conductive layer and the second conductive layer of the first wiring region;

an accommodating space disposed between the third conductive layer and the fourth conductive layer, wherein the first conductive layer and the third conductive layer are disposed close to the accommodating space, and the second conductive layer is disposed on one side of the first conductive layer away from the accommodating space; and a magnetic column disposed within the accommodating space, wherein the third conductive layer comprises a first trace portion having one end in direct contact with and connected to the first conductive layer, to form a part of windings of the magnetic element.

2. The magnetic element according to claim 1, wherein the third conductive layer further comprises a second trace portion which is arranged close to one end of the first trace portion of the third conductive layer and separated from the first trace portion of the third conductive layer, and wherein the second trace portion of the third conductive layer is in direct contact with and connected to the second conductive layer, to form a part of the windings of the magnetic element.

3. The magnetic element according to claim 1, wherein the fourth conductive layer comprises a first trace portion having one end in direct contact with and connected to the first conductive layer, to form a part of the windings of the magnetic element.

4. The magnetic element according to claim 3, wherein the fourth conductive layer further comprises a second trace portion which is arranged close to one end of the first trace portion of the fourth conductive layer and separated from the first trace portion of the fourth conductive layer, and wherein the second trace portion of the fourth conductive layer is in direct contact with and connected to the second conductive layer, to form a part of the windings of the magnetic element.

5. The magnetic element according to claim 3, wherein the second wiring region further comprises at least one fifth conductive layer which is disposed on one side of the fourth conductive layer away from the third conductive layer, wherein one of the at least one fifth conductive layer is connected to the fourth conductive layer through a blind via, to form a part of the windings of the magnetic element.

6. The magnetic element according to claim 1, wherein the fourth conductive layer comprises a first trace portion having one end connected to the first conductive layer through a blind via, to form a part of the windings of the magnetic element.

7. The magnetic element according to claim 6, wherein the fourth conductive layer further comprises a second trace portion which is arranged close to one end of the first trace portion of the fourth conductive layer and separated from the first trace portion of the fourth conductive layer, and wherein the second trace portion of the fourth conductive layer is connected to the second conductive layer through a blind via, to form a part of the windings of the magnetic element.

8. The magnetic element according to claim 1, wherein the second wiring region further comprises at least one sixth conductive layer which is disposed on one side of the third conductive layer away from the fourth conductive layer, wherein one of the at least one sixth conductive layer is connected to the second conductive layer through a blind via, to form a part of the windings of the magnetic element.

9. The magnetic element according to claim 5, wherein the at least one fifth conductive layer comprises one inner fifth conductive layer and at least one outer fifth conductive layer, wherein the at least one outer fifth conductive layer is disposed on one side of the inner fifth conductive layer away from the fourth conductive layer, wherein the inner fifth conductive layer is connected to the fourth conductive layer through a blind via, to form a part of the windings of the magnetic element, and wherein one of the at least one outer fifth conductive layer is connected to the second conductive layer through a blind via, to form a part of the windings of the magnetic element.

10. The magnetic element according to claim 6, wherein the second wiring region further comprises at least one fifth conductive layer which is disposed on one side of the fourth conductive layer away from the third conductive layer, wherein one of the at least one fifth conductive layer is connected to the second conductive layer through a blind via, to form a part of the windings of the magnetic element.

11. The magnetic element according to claim 1, wherein the magnetic element comprises two first wiring regions disposed in the opposite sides of the accommodating space, and wherein each end of the first trace portion of the third conductive layer is in direct contact with and connected to one first conductive layer, to form a part of the windings of the magnetic element.

12. The magnetic element according to claim 11, wherein the third conductive layer further comprises two second trace portions which are arranged close to two ends of the first trace portion of the third conductive layer, respectively, and each separated from the first trace portion of the third conductive layer, and wherein each of the second trace portions of the third conductive layer is in direct contact with and connected to one second conductive layer, to form a part of the windings of the magnetic element.

13. The magnetic element according to claim 1, wherein each inner wall of the accommodating space close to the first conductive layer and the third conductive layer is laid with an inner wall conductive layer, to form a part of the windings of the magnetic element.

14. The magnetic element according to claim 13, wherein the second wiring region further comprises a seventh conductive layer and an eighth conductive layer, each of which is disposed between the fourth conductive layer and the magnetic column, wherein the eighth conductive layer is disposed on one side of the seventh conductive layer away from the magnetic column, and wherein the seventh conductive layer is connected to the eighth conductive layer through a blind via, and in direct contact with and connected to the inner wall conductive layer, to form a part of the windings of the magnetic element.

15. The magnetic element according to claim 1, wherein the magnetic element comprises two first wiring regions, one second wiring region, two accommodating spaces disposed separately, two magnetic columns and one third wiring region, wherein each of the two accommodating spaces is disposed between the two first wiring regions, with the third wiring region interposed between the two accommodating spaces, wherein each of the magnetic columns is disposed within one of the accommodating spaces, respectively, wherein the third wiring region comprises two ninth conductive layers which are arranged along the first direction and are disposed in opposite sides of the third wiring region, respectively, wherein the third conductive layer comprises two first trace portions, each of which is disposed close to one of the accommodating spaces, respectively, and wherein the first conductive layer and the ninth conductive layer, which are arranged on opposite sides of each magnetic column, are in direct contact with and connected to a first end and a second end of the first trace portion of the third conductive layer that is arranged close to the magnetic column, to form a part of the windings of the magnetic element.

16. The magnetic element according to claim 15, wherein the third wiring region further comprises a through hole which is disposed between the two ninth conductive layers, wherein the windings of the magnetic element comprise a plurality of layers of sub-windings which are wound sequentially around each of the magnetic columns from inside to outside, with two outermost-layer sub-windings disposed on the outermost layers away from the two magnetic columns, respectively, and wherein a sidewall of the through hole is configured to form a common winding portion of the two outermost-layer sub-windings.

17. The magnetic element according to claim 15, wherein the third wiring region further comprises two tenth conductive layers disposed separately and an eleventh conductive layer which are all arranged along the first direction, wherein the two tenth conductive layers are both disposed between the two ninth conductive layers, and the eleventh conductive layer is disposed between the two tenth conductive layers.

18. The magnetic element according to claim 17, wherein the third conductive layer further comprises two second trace portions, each of which is separated from the first end of each of the first trace portions of the third conductive layer, respectively, and in direct contact with and connected to the second conductive layer, to form a part of the windings of the magnetic element;

wherein the third conductive layer further comprises two third trace portions, each of which is separated from the second end of each of the first trace portions of the third conductive layer, respectively, and in direct contact with and connected to one of the tenth conductive layers, to form a part of the windings of the magnetic element;

wherein the third conductive layer further comprises a fourth trace portion which is disposed between the two third trace portions of the third conductive layer and separated from the third trace portions of the third conductive layer, wherein the fourth trace portion of the third conductive layer is in direct contact with and connected to the eleventh conductive layer, to form a part of the windings of the magnetic element, wherein the windings of the magnetic element comprise a plurality of layers of sub-windings which are wound sequentially around each of the magnetic columns from inside to outside, with two outermost-layer sub-windings disposed on the outermost layers away from the two magnetic columns, respectively, and wherein the eleventh conductive layer is configured to form a common winding portion of the two outermost-layer sub-windings.

19. The magnetic element according to claim 1, wherein the windings of the magnetic element comprise a plurality of layers of sub-windings with at least three layers of the sub-windings wound sequentially around each of the magnetic columns from inside to outside, and wherein one of two layers of the sub-windings which is disposed closest to each of the magnetic column is configured to form primary sub-windings of the magnetic element.

20. The magnetic element according to claim 15, wherein the first conductive layer and the second conductive layer are disposed on the opposite surface of the first sub-substrate, and wherein the magnetic element further comprises a second sub-substrate which is configured to form the third wiring region, the two ninth conductive layers are disposed on the opposite surface of the second sub-substrate.

21. A substrate, comprising:

a first wiring region comprising a first conductive layer and a second conductive layer which are arranged along a first direction;

a second wiring region comprising a third conductive layer and a fourth conductive layer which are arranged along a second direction perpendicular to the first direction and are disposed in opposite sides of the second wiring region, respectively; and a first sub-substrate configured to form the first conductive layer and the second conductive layer of the first wiring region, wherein the third conductive layer comprises a first trace portion having one end in direct contact with and connected to the first conductive layer.

* * * * *